(12) United States Patent
Wang

(10) Patent No.: US 12,563,219 B2
(45) Date of Patent: *Feb. 24, 2026

(54) ERROR MITIGATION FOR SUBLAYERS IN VIDEO CODING

(71) Applicant: Huawei Technologies Co., Ltd., Guangdong (CN)

(72) Inventor: Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/777,052

(22) Filed: Jul. 18, 2024

(65) Prior Publication Data

US 2025/0016349 A1 Jan. 9, 2025

Related U.S. Application Data

(63) Continuation of application No. 17/703,401, filed on Mar. 24, 2022, now Pat. No. 12,075,076, which is a (Continued)

(51) Int. Cl.
*H04N 19/00* (2014.01)
*H04N 19/149* (2014.01)
(Continued)

(52) U.S. Cl.
CPC .......... *H04N 19/44* (2014.11); *H04N 19/149* (2014.11); *H04N 19/154* (2014.11);
(Continued)

(58) Field of Classification Search
None
See application file for complete search history.

(56) References Cited

U.S. PATENT DOCUMENTS 8,345,774 B2 1/2013 Wu et al.
8,615,038 B2 12/2013 Wang
(Continued)

FOREIGN PATENT DOCUMENTS

CN 101653002 A 2/2010
CN 101895748 A 11/2010
(Continued)

OTHER PUBLICATIONS

Miska M. Hannuksela (Nokia) et al:"AHG8/AHG12: Decoding multiple independent layers with single-layer decoding process. "Joint Video Experts Team (JVET) of ITU-T SG 16 WP 3 and ISO/IEC JTC 1/SC 29/WG 11, 15th Meeting: Gothenburg, SE, Jul. 3-12, 2019. JVET-O1130-v3, total 12 pages.

(Continued)

*Primary Examiner* — Zhihan Zhou
(74) *Attorney, Agent, or Firm* — Conley Rose, P.C.

(57) ABSTRACT

A video coding mechanism is disclosed. The mechanism includes encoding a bitstream comprising a video parameter set (VPS) and one or more sublayers. A buffering period (BP) supplemental enhancement information (SEI) message comprising a BP maximum sublayers minus one (bp_max_sublayers_minus1) is also encoded into the bitstream.

(Continued)

The bp_max_sublayers_minus1 is set to a value in a range of zero to a maximum number of sublayers indicated in the VPS. A hypothetical reference decoder (HRD) is initialized based on the BP SEI message. A set of bitstream conformance tests are performed on the sublayers. The bitstream is stored for communication toward a decoder.

20 Claims, 12 Drawing Sheets

Related U.S. Application Data continuation of application No. PCT/US2020/049730, filed on Sep. 8, 2020.

(60) Provisional application No. 62/905,244, filed on Sep. 24, 2019.

(51) Int. Cl.

| | |
|---|---|
| *H04N 19/154* | (2014.01) |
| *H04N 19/169* | (2014.01) |
| *H04N 19/172* | (2014.01) |
| *H04N 19/187* | (2014.01) |
| *H04N 19/30* | (2014.01) |
| *H04N 19/423* | (2014.01) |
| *H04N 19/44* | (2014.01) |
| *H04N 19/46* | (2014.01) |
| *H04N 19/70* | (2014.01) |

(52) U.S. Cl.
CPC ......... *H04N 19/172* (2014.11); *H04N 19/187* (2014.11); *H04N 19/188* (2014.11); *H04N 19/30* (2014.11); *H04N 19/423* (2014.11); *H04N 19/46* (2014.11); *H04N 19/70* (2014.11)

(56) References Cited

U.S. PATENT DOCUMENTS

| | | | |
|---|---|---|---|
| 9,473,771 | B2 | 10/2016 | Wang et al. |
| 9,635,369 | B2 | 4/2017 | Chen et al. |
| 9,648,333 | B2 | 5/2017 | He et al. |
| 9,819,945 | B2 | 11/2017 | Wang et al. |
| 10,165,218 | B2 | 12/2018 | Fernandes et al. |
| 10,390,087 | B2 | 8/2019 | Ramasubramonian et al. |
| 10,432,951 | B2 | 10/2019 | Wang |
| 2004/0190606 | A1 | 9/2004 | Deshpande |
| 2007/0157060 | A1 | 7/2007 | Ganga et al. |
| 2008/0013620 | A1 | 1/2008 | Hannuksela et al. |
| 2009/0180545 | A1 | 7/2009 | Wu et al. |
| 2013/0170561 | A1 | 7/2013 | Hannuksela |
| 2014/0003489 | A1 | 1/2014 | Hannuksela |
| 2014/0023146 | A1 | 1/2014 | Deshpande |
| 2014/0086317 | A1 | 3/2014 | Wang |
| 2014/0086332 | A1 | 3/2014 | Wang |
| 2014/0098894 | A1 | 4/2014 | Wang |
| 2014/0098895 | A1 | 4/2014 | Wang |
| 2014/0098896 | A1 | 4/2014 | Wang |
| 2014/0192149 | A1 | 7/2014 | Wang et al. |
| 2014/0192903 | A1 | 7/2014 | Wang |
| 2014/0219346 | A1 | 8/2014 | Ugur et al. |
| 2014/0301469 | A1 | 10/2014 | Wang et al. |
| 2014/0301477 | A1 | 10/2014 | Deshpande |
| 2014/0355692 | A1 | 12/2014 | Ramasubramonian et al. |
| 2015/0016532 | A1 | 1/2015 | Chen et al. |
| 2015/0016547 | A1 | 1/2015 | Tabatabai et al. |
| 2015/0029394 | A1 | 1/2015 | Fernandes et al. |
| 2015/0103884 | A1 | 4/2015 | Ramasubramonian et al. |
| 2015/0103921 | A1 | 4/2015 | Hannuksela |
| 2015/0103926 | A1 | 4/2015 | Hannuksela |
| 2015/0181233 | A1 | 6/2015 | Ramasubramonian et al. |
| 2015/0264099 | A1 | 9/2015 | Deshpande |
| 2015/0264404 | A1 | 9/2015 | Hannuksela |

| | | | |
|---|---|---|---|
| 2015/0271498 | A1 | 9/2015 | Wang et al. |
| 2015/0271528 | A1 | 9/2015 | Wang et al. |
| 2015/0312580 | A1 | 10/2015 | Hannuksela |
| 2015/0319448 | A1 | 11/2015 | Ramasubramonian et al. |
| 2015/0319449 | A1 | 11/2015 | Ramasubramonian et al. |
| 2015/0358640 | A1 | 12/2015 | Hendry et al. |
| 2015/0373346 | A1 | 12/2015 | Wang |
| 2015/0373356 | A1 | 12/2015 | Wang |
| 2015/0373373 | A1 | 12/2015 | Wang |
| 2015/0373374 | A1 | 12/2015 | Ramasubramonian et al. |
| 2015/0373376 | A1 | 12/2015 | Wang et al. |
| 2015/0381991 | A1 | 12/2015 | Wang et al. |
| 2016/0112724 | A1 | 4/2016 | Hendry et al. |
| 2016/0173887 | A1 | 6/2016 | Deshpande |
| 2016/0191931 | A1 | 6/2016 | Hannuksela |
| 2016/0261878 | A1 | 9/2016 | Deshpande |
| 2016/0366428 | A1 | 12/2016 | Deshpande |
| 2017/0013267 | A1 | 1/2017 | Tanaka et al. |
| 2017/0134742 | A1* | 5/2017 | Deshpande .......... H04N 19/184 |
| 2017/0150160 | A1 | 5/2017 | Deshpande |
| 2019/0058895 | A1 | 2/2019 | Deshpande |
| 2019/0166376 | A1 | 5/2019 | Thomas et al. |
| 2019/0174144 | A1 | 6/2019 | Hannuksela |
| 2021/0409718 | A1 | 12/2021 | Wieckowski et al. |
| 2022/0182641 | A1 | 6/2022 | Nam et al. |
| 2022/0201336 | A1 | 6/2022 | Filippov et al. |
| 2022/0232207 | A1 | 7/2022 | Zhang et al. |
| 2022/0232257 | A1 | 7/2022 | Wang |
| 2022/0264153 | A1 | 8/2022 | Deshpande |
| 2022/0312042 | A1* | 9/2022 | Deshpande ............ H04N 19/70 |
| 2022/0353536 | A1 | 11/2022 | Samuelsson et al. |
| 2022/0353537 | A1 | 11/2022 | Deshpande et al. |

FOREIGN PATENT DOCUMENTS

| | | | |
|---|---|---|---|
| CN | 104396260 | A | 3/2015 |
| CN | 104641648 | A | 5/2015 |
| CN | 104662914 | A | 5/2015 |
| CN | 104662915 | A | 5/2015 |
| CN | 104704842 | A | 6/2015 |
| CN | 104813660 | A | 7/2015 |
| CN | 104919802 | A | 9/2015 |
| CN | 105379285 | A | 3/2016 |
| CN | 105556975 | A | 5/2016 |
| CN | 105612752 | A | 5/2016 |
| CN | 106170981 | A | 11/2016 |
| CN | 106416258 | A | 2/2017 |
| CN | 106416260 | A | 2/2017 |
| CN | 106464916 | A | 2/2017 |
| CN | 106464917 | A | 2/2017 |
| CN | 106464922 | A | 2/2017 |
| CN | 106464934 | A | 2/2017 |
| CN | 107079176 | A | 8/2017 |
| CN | 107431819 | A | 12/2017 |
| CN | 108243339 | A | 7/2018 |
| CN | 108495140 | A | 9/2018 |
| CN | 110009537 | A | 7/2019 |
| EP | 3138291 | B1 | 11/2018 |
| JP | 2015526970 | A | 9/2015 |
| JP | 2016526351 | A | 9/2016 |
| JP | 2017525231 | A | 8/2017 |
| JP | 2017525234 | A | 8/2017 |
| JP | 2017535184 | A | 11/2017 |
| JP | 2018023139 | A | 2/2018 |
| JP | 2018139433 | A | 9/2018 |
| JP | 7589419 | B2 | 11/2024 |
| RU | 2628215 | C2 | 8/2017 |
| RU | 2635892 | C2 | 11/2017 |
| RU | 2643463 | C2 | 2/2018 |
| RU | 2653299 | C2 | 5/2018 |
| WO | 2011148887 | A1 | 12/2011 |
| WO | 2014168893 | A1 | 10/2014 |
| WO | 2015056158 | A1 | 4/2015 |
| WO | 2015098713 | A1 | 7/2015 |
| WO | 2016061334 | A1 | 4/2016 |

(56)                References Cited

OTHER PUBLICATIONS

Benjamin Bross et al:"Versatile Video Coding (Draft 7)."Joint Video Experts Team (JVET) of ITU-T SG 16 WP 3 and ISO/IEC JTC 1/SC 29/WG 11, 16th Meeting: Geneva, CH, Oct. 1-11, 2019. JVET-P2001-vE, total 489 pages.

Qualcomm Incorporated:"MV-HEVC/SHVC HLS: On multi-mode bitstream extraction." Document: JCTVC-O0273. Joint Collaborative Team on Video Coding (JCT-VC) of ITU-T SG 16 WP 3 and ISO/IEC JTC 1/SC 29/WG 11 15th Meeting: Geneva, CH, Oct. 23-Nov. 2013. total 9 pages.

Document: JVET-N1001-v10, Bross B et al, "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, 406 pages.

ITU-T H.265, Feb. 2018, "Series H: Audiovisual and Multimedia Systems Infrastructure of audiovisual services—Coding of moving video, High efficiency video coding," 692 pages.

Document: JVET-S0269 SpecText based on JVET-S2001-v5, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 18 pages.

Document: JVET-O1130-v3, Hannuklsela, M., et al., "AHG8/AHG 12: Decoding multiple independent layers with single-layer decoding process," Joint Video Experts Team (JVET) of ITU-T SG 16 WP 3 and ISO/IEC JTC 1/SC 29/ WG 11 15th Meeting: Gothenburg, SE, Jul. 3-12, 2019, 14 pages.

Ei Okuho, supervised, "H. 265/HEVC textbook", first edition, Oct. 21, 2013, Impress Japan Co., Ltd., pp. 214-226, ISBN: 978-4-8443-3468-2.

Document: JVET-O1130-v3, Hannuksela, M., et al., "AHG8/AHG12: Decoding multiple independent layers with single-layer decoding process," Joint Video Experts Team (JVET) of ITU-T SG 16 WP 3 and ISO/IEC JTC 1/SC 29/WG 11, 15th Meeting: Gothenburg, SE, Jul. 3-12, 2019, 12 pages.

Document: JVET-P0118-v4, Wang, Y., "AHG8: Scalability—HRD," Joint Video Experts Team (JVET) of ITU-T SG 16 WP 3 and 1S0/IEC JTC 1/SC 29/WG 11, 16th Meeting: Geneva, CH, Oct. 1-11, 2019, 4 pages.

Document: JCTVC-R0272v2 (Document: JCT3V-10062v2), Wang, Y., et al, "HEVCv1/MV-HEVC/SHVC HLS: Conformance cleanups," Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, 4 pages.

Document: JCTVC-P0182r2, He, Y., et al., "AHG9: On Sub-bitstream extraction and rewriting process," Joint Collaborative Team on Video Coding (JCT-VC) of ITU-T SG 16 WP 3 and ISO/IEC JTC 1/SC 29/WG 11, 16th Meeting: San Jose, US, Jan. 9-17, 2014, 10 pages.

Xu, X., "Design and Implementation of H.265 Stream Analysis Software, Audio-visual Industry Radio and Television Technology," Apr. 2018, with an English Abstract, 12 pages.

Zhou, Y., et al., "Overview of the Core Technologies of the H.265 Codec Standard," Communication World, Aug. 2017, with an English Abstract, 3 pages.

Document: JVET-P0125-v1, Wang, Y., et al., "AHG8/AHG17: Miscellaneous HLS topics," Joint Video Experts Team (JVET) of ITU-T SG 16 WP 3 and 1S0/IEC JTC 1/SC 29/WG 11, 16th Meeting: Geneva, CH, Oct. 1-11, 2019, 3 pages.

He C., "Error Control in Scalable Video Coding," Communications Technology, vol. 43, No. 03, No. 219, 2010, with an English Abstract, 3 pages.

JVET-P0118-v1, Ye-Kui Wang et al., "AHG8: Scalability—HRD," Joint Video Experts Team (JVET) of ITU-T SG 16 WP 3 and ISO/IEC JTC 1/SC 29/WG 11, 16th Meeting: Geneva, CH, Oct. 1-11, 2019, 2 pages.

JCT3V-F0091 (Document: JCTVC-O0273), Ying Chen et al, "MV-HEVC/SHVC HLS: On multi-mode bitstream extraction," Joint Collaborative Team on 3D Video Coding Extensions of ITU-T SG 16 WP 3 and ISO/IECJTC 1/SC 29/WG11, 6th Meeting: Geneva, CH, Oct. 25-Nov. 1, 2013, 9 pages.

JVET-O2001-vE, Benjamin Bross et al, "Versatile Video Coding (Draft 6)," Joint Video Experts Team (JVET) of ITU-T SG 16 WP 3 and 1S0/IEC JTC 1/SC 29/WG 11, 15th Meeting: Gothenburg, SE, Jul. 3-12, 2019, 464 pages.

JVET-O0228, Virginie Drugeon, "AHG17: Harmonized HRD parameters signaling," Joint Video Experts Team (JVET) of ITU-T SG 16 WP 3 and ISO/IECJTC 1/SC 29/WG11, 15th Meeting: Gothenburg, SE, Jul. 3-12, 2019, 5 pages.

JVET-P2001-vC, Benjamin Bross et al, "Versatile Video Coding (Draft 7)," Joint Video Experts Team (JVET) of ITU-T SG 16 WP 3 and ISO/IEC JTC 1/SC 29/WG 11, 16th Meeting: Geneva, CH, Oct. 1-11, 2019, 489 pages.

"Line Transmission of Non-Telephone Signals Video Codec for Audiovisual Services at p x 64 kbits," ITU-T Recommendation H.261, Mar. 1993, 29 pages.

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services—Coding of moving video; High efficiency video coding" Recommendation ITU-T H.265, Apr. 2013, 317 pages.

Bross, B., et al., "Versatile Video Coding (Draft 6)," Document: JVET-O2001-vE, Joint Video Experts Team (JVET) of ITU-T SG 16 WP 3 and ISO/IEC JTC 1/SC 29/WG 11 15th Meeting: Gothenburg, SE, Jul. 3-12, 2019, 455 pages.

Document: JVET-O0177, Deshpande, S., et al., "On HRD Signalling," Joint Video Experts Team (JVET) of ITU-T SG 16 WP 3 and ISO/IEC JTC 1/SC 29/WG 11, 15th Meeting: Gothenburg, SE, Jul. 3-12, 2019, 5 pages.

Series H: Audiovisual and Multimedia Systems; Infrastructure of audiovisual services—Coding of moving video; High efficiency video coding, Recommendation ITU-T H.265, Oct. 2014, p. 244-245,270,316-317,418-419.

Sjoberg, R., et al., "Overview of HEVC High-Level Syntax and Reference Picture Management," IEEE Transactions on Circuits and Systems for Video Technology, vol. 22, No. 12, Dec. 2012, 13 pages.

Document: JVET-P0202, Drugeon, V., et al., "AHG17: Harmonized HRD parameters Signaling for decoding units," Joint Video Experts Team (JVET) of ITU-T SG 16 WP 3 and ISO/IEC JTC 1/SC 29/WG 11, 16th Meeting: Geneva, CH, Oct. 1-11, 2019, 4 pages.

Rickard Sjoberg et al. "Overview of HEVC high-level syntax and reference picture management," TCSVT 6212, Dec. 2012, 14 pages.

Benjamin Bross et al:"Versatile Video Coding (Draft 7)." Document: JVET-S0269 SpecText based on JVET-S2001-v5 Joint Video Experts Team (JVET) of ITU-T SG 16 WP 3 and ISO/IEC JTC 1/SC 29/WG 11 19th Meeting: by teleconference, Jun. 22-Jul. 1, 2020. total 538 pages.

Ei Okuho, supervised, "H. 265/HEVC textbook", first edition, Oct. 21, 2013, Impress Japan Co., Ltd., total 52 pages, ISBN: 978-4-8443-3468-2.

Benjamin Bross et al: "Versatile Video Coding (Draft 6)", Joint Video Experts Team (JVET) of ITU-T SG 16 WP 3 and ISO/IEC JTC 1/SC 29/WG 11, JVET-O2001-vE, 15th Meeting: Gothenburg, SE, Jul. 3-12, 2019, total 456 pages.

Benjamin Bross et al: "Versatile Video Coding (Draft 6)", Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O2001-vE, total 464 pages.

(56) References Cited

OTHER PUBLICATIONS

Benjamin Bross:"Versatile Video Coding (Draft 8)", Joint Video Experts Team (JVET) of ITU-T SG 16 WP 3 and ISO/IEC JTC 1/SC 29/WG 11 JVET-Q2001-vE, Mar. 12, 2020, total 510 pages.
Hannuksela (Nokia) M M et al:"AHG8/AHG12:Decoding multiple independent layers with single-layer decoding process", 15.JVET Meeting;Jul. 3-12, 2019;Gothenburg;(The Joint Video Exploration Team of ISO/ECJTC1/SC29/WG11 and ITU-T SG.16 ), No. JVET-O1130, of ITU-T SG 16 WP 3 and ISO/IEC JTC 1/SC 29/WG 11/JVET-O1130-v3.zip,JVETO1130-v3.doc—09 Julio 2019, total 12 pages.
Document: JVET-P0968-v5, Ye-Kui Wang, "Report of BoG on high-level syntax," Joint Video Experts Team (JVET}, of ITU-T SG 16 WP 3 and ISO/IEC JTC 1/SC 29/WG 11, 16th Meeting: Geneva, CH, Oct. 1-11, 2019, total 5 pages.

* cited by examiner

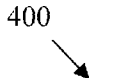
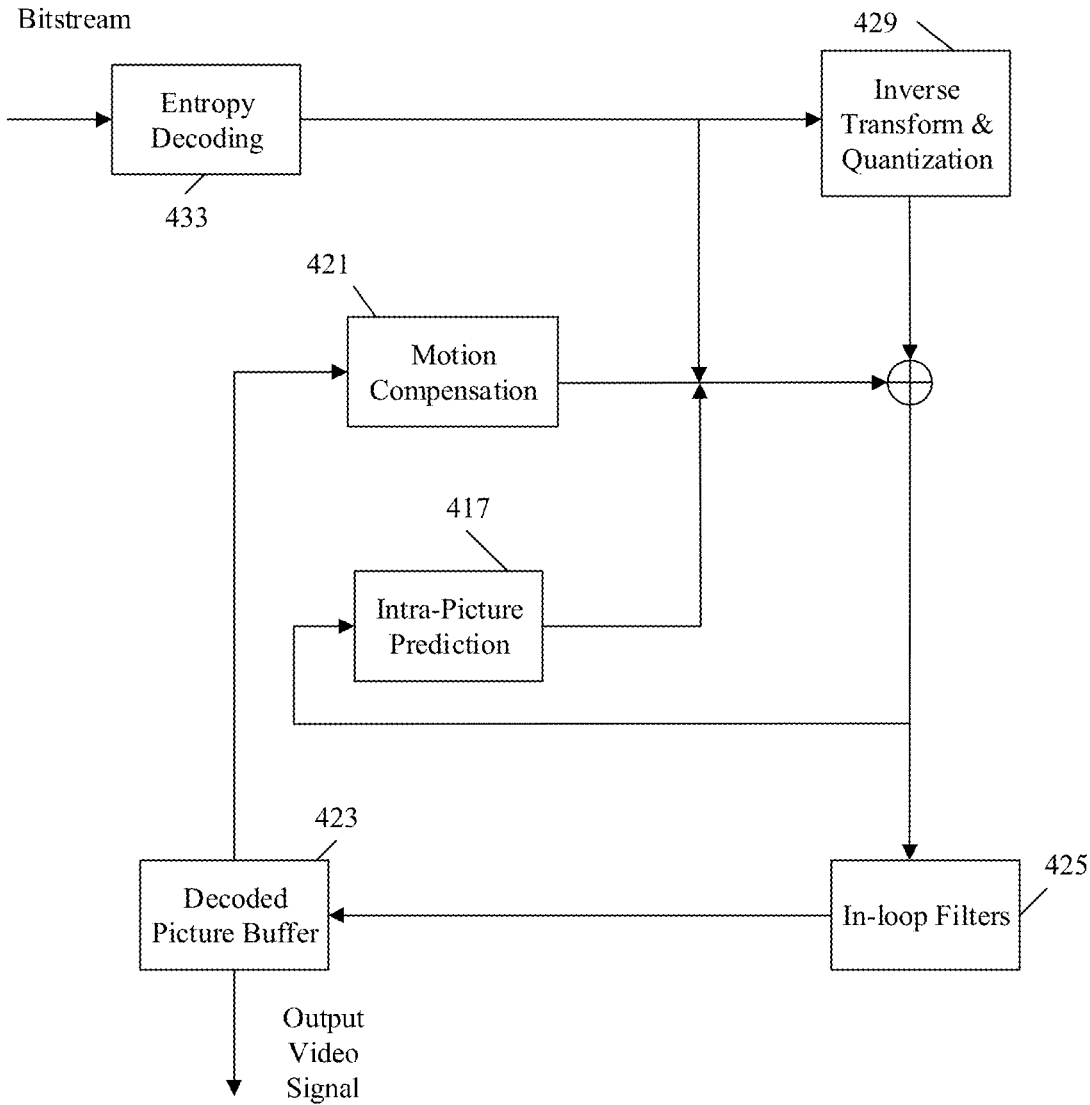
FIG. 4

Hypothetical Reference Decoder

900

1000

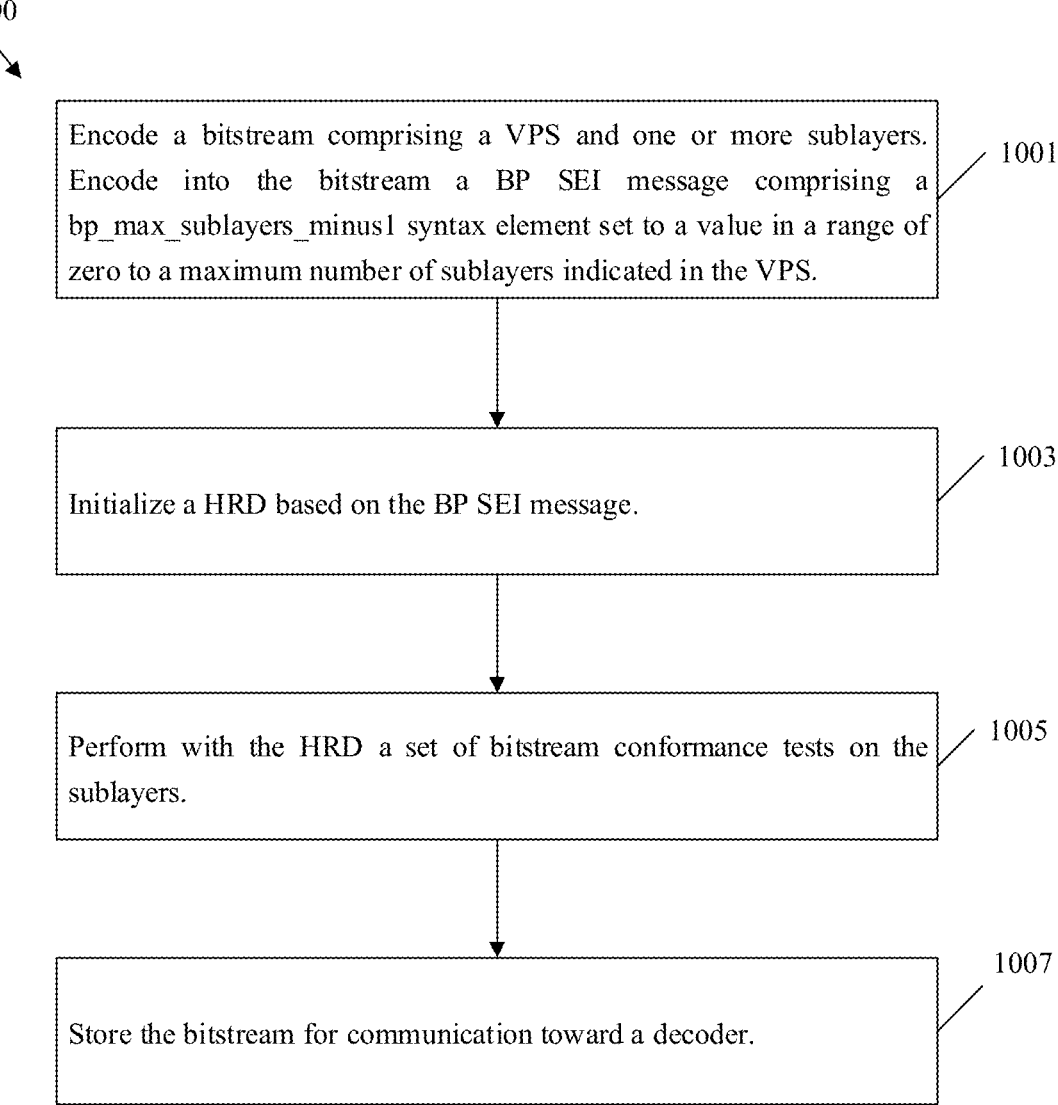

Encode a bitstream comprising a VPS and one or more sublayers. Encode into the bitstream a BP SEI message comprising a bp_max_sublayers_minus1 syntax element set to a value in a range of zero to a maximum number of sublayers indicated in the VPS.

1001

Initialize a HRD based on the BP SEI message.

1003

Perform with the HRD a set of bitstream conformance tests on the sublayers.

1005

Store the bitstream for communication toward a decoder.

Receive a bitstream comprising a VPS, one or more sublayers, and a bp_max_sublayers_minus1 syntax element set to a value in a range of zero to a maximum number of sublayers indicated in the VPS.

1101

Decode a picture from the one or more sublayers.

1103

Forward the picture for display as part of a decoded video sequence.

1107

1200

1202

ERROR MITIGATION FOR SUBLAYERS IN VIDEO CODING

CROSS-REFERENCE TO RELATED APPLICATIONS

This is a continuation of U.S. patent application Ser. No. 17/703,401 filed Mar. 24, 2022, which is a continuation of International Application No. PCT/US2020/049730 filed Sep. 8, 2020, which claims the benefit of U.S. Provisional Patent Application No. 62/905,244 filed Sep. 24, 2019, all of which are hereby incorporated by reference.

TECHNICAL FIELD

The present disclosure is generally related to video coding, and is specifically related to hypothetical reference decoder (HRD) parameter changes to support efficient encoding and/or conformance testing of multi-layer bitstreams.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented by a decoder, the method comprising: receiving, by a receiver of the decoder, a bitstream comprising a video parameter set (VPS), one or more sublayers, and a buffering period (BP) maximum sublayers minus one (bp_max_sublayers_minus1) set to a value in a range of zero to a maximum number of sublayers indicated in the VPS; and decoding, by a processor of the decoder, a picture from the one or more sublayers.

Video coding systems employ various conformance tests to ensure a bitstream is decodable by a decoder. For example, a conformance check may include testing the entire bitstream for conformance, then testing each layer of the bitstream for conformance, and finally checking potential decodable outputs for conformance. In order to implement conformance checks, corresponding parameters are included in the bitstream. A hypothetical reference decoder (HRD) can read the parameters and perform the tests. A video may include many layers and many different output layer sets (OLSs). Upon request, the encoder transmits one or more layers of a selected OLS. For example, the encoder may transmit the best layer(s) from an OLS that can be supported by the current network bandwidth. A problem relates to the usage of sequence parameter sets (SPSs) to contain syntax elements related to each video sequence in a video. Video coding systems may code video in layers and/or sublayers. Video sequences may operate differently at different layers and/or sublayers. Hence, different layers may refer to different SPSs. A BP SEI message may indicate the layers/sublayers to be checked for conformance to standards. Some video coding systems may indicate that the BP SEI message applies to the layers/sublayers indicated in the SPS. This may cause problems when different layers have referenced different SPSs as such SPSs may include contradictory information, which results in unexpected errors. The disclosed example includes mechanisms to address errors relating to conformance checking when multiple layers are employed in a video sequence. Specifically, the BP SEI message is modified to indicate that any number of layers/sublayers described in a VPS may be checked for conformance. For example, the BP SEI message may contain a bp_max_sublayers_minus1 syntax element that indicates the number of layers/sublayers that are associated with the data in the BP SEI message. Meanwhile, a VPS maximum sublayers minus one (vps_max_sublayers_minus1) syntax element in the VPS indicates the number of sublayers in the entire video. The bp_max_sublayers_minus1 syntax element may be set to any value from zero to the value of the vps_max_sublayers_minus1 syntax element. In this way, any number of layers/sublayers in the video can be checked for conformance while avoiding layer based sequence issues related to SPS inconstancies. Accordingly, the present disclosure avoids layer based coding errors, and hence increases the functionality of an encoder and/or a decoder. Further, the present example supports layer based coding, which may increase coding efficiency. As such, the present example supports reduced processor, memory, and/or network resource usage at an encoder and/or a decoder.

Optionally, in any of the preceding aspects, another implementation of the aspect provides, wherein the bp_max_sublayers_minus1 is included in a buffering period supplemental enhancement information (SEI) message, and wherein the BP SEI message includes parameters associated with a maximum number of temporal sublayers specified by bp_max_sublayers_minus1.

Optionally, in any of the preceding aspects, another implementation of the aspect provides, wherein the parameters in the BP SEI message include an initial coded picture buffer (CPB) removal delay and an initial CPB removal offset.

Optionally, in any of the preceding aspects, another implementation of the aspect provides, wherein the maximum number of sublayers indicated in the VPS are included in a VPS maximum sublayers minus one (vps_max_sublayers_minus1).

Optionally, in any of the preceding aspects, another implementation of the aspect provides, wherein the vps_max_sublayers_minus1 is contained in the VPS.

Optionally, in any of the preceding aspects, another implementation of the aspect provides, wherein the BP SEI message is for initialization of a hypothetical reference decoder (HRD) at a position of an associated access unit (AU) in decoding order.

Optionally, in any of the preceding aspects, another implementation of the aspect provides, wherein the bitstream is a temporal scalable bitstream, wherein the one or more sublayers are temporal scalable layers of the bitstream, and wherein each sublayer includes video coding layer (VCL) network abstraction layer (NAL) units and associated non-VCL NAL units with a same value of a temporal identifier (TemporalId) variable.

In an embodiment, the disclosure includes a method implemented by an encoder, the method comprising: encoding, by a processor of the encoder, a bitstream comprising a VPS and one or more sublayers; encoding into the bitstream, by the processor, a BP SEI message comprising a bp_max_sublayers_minus1 set to a value in a range of zero to a maximum number of sublayers indicated in the VPS; initializing, by the processor, a HRD based on the BP SEI message; and performing with the HRD, by the processor, a set of bitstream conformance tests on the sublayers.

Video coding systems employ various conformance tests to ensure a bitstream is decodable by a decoder. For example, a conformance check may include testing the entire bitstream for conformance, then testing each layer of the bitstream for conformance, and finally checking potential decodable outputs for conformance. In order to implement conformance checks, corresponding parameters are included in the bitstream. A HRD can read the parameters and perform the tests. A video may include many layers and many different OLSs. Upon request, the encoder transmits one or more layers of a selected OLS. For example, the encoder may transmit the best layer(s) from an OLS that can be supported by the current network bandwidth. A problem relates to the usage of SPSs to contain syntax elements related to each video sequence in a video. Video coding systems may code video in layers and/or sublayers. Video sequences may operate differently at different layers and/or sublayers. Hence, different layers may refer to different SPSs. A BP SEI message may indicate the layers/sublayers to be checked for conformance to standards. Some video coding systems may indicate that the BP SEI message applies to the layers/sublayers indicated in the SPS. This may cause problems when different layers have referenced different SPSs as such SPSs may include contradictory information, which results in unexpected errors. The disclosed example includes mechanisms to address errors relating to conformance checking when multiple layers are employed in a video sequence. Specifically, the BP SEI message is modified to indicate that any number of layers/sublayers described in a VPS may be checked for conformance. For example, the BP SEI message may contain a bp_max_sublayers_minus1 syntax element that indicates the number of layers/sublayers that are associated with the data in the BP SEI message. Meanwhile, a vps_max_sublayers_minus1 syntax element in the VPS indicates the number of sublayers in the entire video. The bp_max_sublayers_minus1 syntax element may be set to any value from zero to the value of the vps_max_sublayers_minus1 syntax element. In this way, any number of layers/sublayers in the video can be checked for conformance while avoiding layer based sequence issues related to SPS inconstancies. Accordingly, the present disclosure avoids layer based coding errors, and hence increases the functionality of an encoder and/or a decoder. Further, the present example supports layer based coding, which may increase coding efficiency. As such, the present example supports reduced processor, memory, and/or network resource usage at an encoder and/or a decoder.

Optionally, in any of the preceding aspects, another implementation of the aspect provides, wherein the BP SEI message includes parameters associated with a maximum number of temporal sublayers specified by bp_max_sublayers_minus1.

Optionally, in any of the preceding aspects, another implementation of the aspect provides, wherein the parameters in the BP SEI message include an initial CPB removal delay and an initial CPB removal offset.

Optionally, in any of the preceding aspects, another implementation of the aspect provides, wherein the maximum number of sublayers indicated in the VPS are included in a vps_max_sublayers_minus1.

Optionally, in any of the preceding aspects, another implementation of the aspect provides, wherein the vps_max_sublayers_minus1 is contained in the VPS.

Optionally, in any of the preceding aspects, another implementation of the aspect provides, wherein the HRD is initialized at a position of an associated AU in decoding order based on the BP SEI message.

Optionally, in any of the preceding aspects, another implementation of the aspect provides, wherein the bitstream is a temporal scalable bitstream, wherein the one or more sublayers are temporal scalable layers of the bitstream, and wherein each sublayer includes VCL NAL units and associated non-VCL NAL units with a same value of a TemporalId variable.

In an embodiment, the disclosure includes a video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising a VPS, one or more sublayers, and a bp_max_sublayers_minus1 set to a value in a range of zero to a maximum number of sublayers indicated in the VPS; a decoding means for decoding a picture from the one or more sublayers; and a forwarding means for forwarding the picture for display as part of a decoded video sequence.

Optionally, in any of the preceding aspects, another implementation of the aspect provides, wherein the decoder is further configured to perform the method of any of the preceding aspects.

In an embodiment, the disclosure includes an encoder comprising: an encoding means for: encoding a bitstream comprising a VPS and one or more sublayers; and encoding into the bitstream a BP SEI message comprising a bp_max_sublayers_minus1 set to a value in a range of zero to a maximum number of sublayers indicated in the VPS; an initializing means for initializing a HRD based on the BP SEI message; a HRD means for performing a set of bitstream conformance tests on the sublayers; and a storing means for storing the bitstream for communication toward a decoder.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a schematic diagram illustrating an example video decoder.

FIG. 10 is a flowchart of an example method of encoding a video sequence into a bitstream by including a BP SEI message that directly references a maximum sublayer for a bitstream conformance test by a HRD.

DETAILED DESCRIPTION

Figure 1:
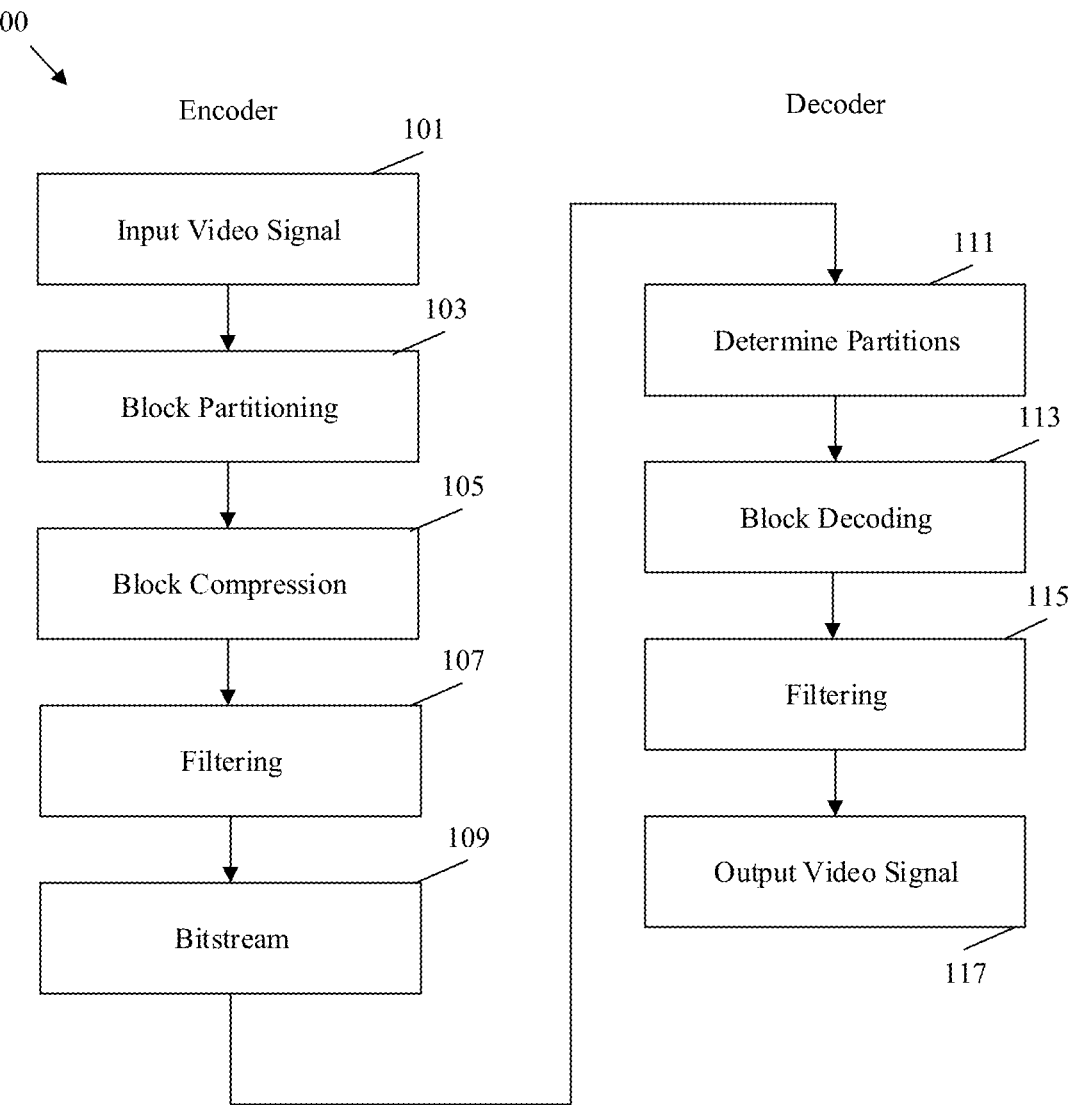
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A picture that is being encoded or decoded can be referred to as a current picture for clarity of discussion. A network abstraction layer (NAL) unit is a syntax structure containing data in the form of a Raw Byte Sequence Payload (RBSP), an indication of the type of data, and emulation prevention bytes, which are interspersed as desired. A video coding layer (VCL) NAL unit is a NAL unit coded to contain video data, such as a coded slice of a picture. A non-VCL NAL unit is a NAL unit that contains non-video data such as syntax and/or parameters that support decoding the video data, performance of conformance checking, or other operations. An access unit (AU) is a set of NAL units that are associated with each other according to a specified classification rule and pertain to one particular output time. A decoding unit (DU) is an AU or a sub-set of an AU and associated non-VCL NAL units. For example, an AU includes VCL NAL units and any non-VCL NAL units associated with the VCL NAL units in the AU. Further, the DU includes the set of VCL NAL units from the AU or a subset thereof, as well as any non-VCL NAL units associated with the VCL NAL units in the DU. A layer is a set of VCL NAL units that share a specified characteristic (e.g., a common resolution, frame rate, image size, etc.) and associated non-VCL NAL units. A decoding order is an order in which syntax elements are processed by a decoding process. A video parameter set (VPS) is a data unit that contains parameters related to an entire video.

A temporal scalable bitstream is a bitstream coded in multiple layers providing varying temporal resolution/frame rate (e.g., each layer is coded to support a different frame rate). A sublayer is a temporal scalable layer of a temporal scalable bitstream including VCL NAL units with a particular temporal identifier value and associated non-VCL NAL units. For example, a temporal sublayer is a layer that contains video data associated with a specified frame rate. A sublayer representation is a subset of the bitstream containing NAL units of a particular sublayer and the lower sublayers. Hence, one or more temporal sublayers may be combined to achieve a sublayer representation that can be decoded to result in a video sequence with a specified frame rate. An output layer set (OLS) is a set of layers for which one or more layers are specified as output layer(s). An output layer is a layer that is designated for output (e.g., to a display). An OLS index is an index that uniquely identifies a corresponding OLS. A zeroth (0-th) OLS is an OLS that contains only a lowest layer (layer with a lowest layer identifier) and hence contains only an output layer. A temporal identifier (ID) is a data element that indicates data corresponds to temporal location in a video sequence. A sub-bitstream extraction process is a process that removes NAL units from a bitstream that do not belong to a target set as determined by a target OLS index and a target highest temporal ID. The sub-bitstream extraction process results in an output sub-bitstream containing NAL units from the bitstream that are part of the target set.

A HRD is a decoder model operating on an encoder that checks the variability of bitstreams produced by an encoding process to verify conformance with specified constraints. A bitstream conformance test is a test to determine whether an encoded bitstream complies with a standard, such as Versatile Video Coding (VVC). HRD parameters are syntax elements that initialize and/or define operational conditions of an HRD. HRD parameters can be contained in a HRD parameter syntax structure. A syntax structure is a data object configured to include a plurality of different parameters. A syntax element is a data object that contains one or more parameters of the same type. Hence, a syntax structure can contain a plurality of syntax elements. Sequence-level HRD parameters are HRD parameters that apply to an entire coded video sequence. A maximum HRD temporal ID (hrd_max_tid[i]) specifies the temporal ID of the highest sublayer representation for which the HRD parameters are contained in an i-th set of OLS HRD parameters. A general HRD parameters (general_hrd_parameters) syntax structure is a syntax structure that contains sequence level HRD parameters. An operation point (OP) is a temporal subset of an OLS that is identified by an OLS index and a highest temporal ID. An OP under test (targetOp) is an OP that is selected for conformance testing at a HRD. A target OLS is an OLS that is selected for extraction from a bitstream. A decoding unit HRD parameters present flag (decoding_unit_hrd_params_present_flag) is a flag that indicates whether corresponding HRD parameters operate at a DU level or an AU level. A coded picture buffer (CPB) is a first-in first-out buffer in a HRD that contains coded pictures in decoding order for use during bitstream conformance verification. A decoded picture buffer (DPB) is a buffer for holding decoded pictures for reference, output reordering, and/or output delay.

A supplemental enhancement information (SEI) message is a syntax structure with specified semantics that conveys information that is not needed by the decoding process in order to determine the values of the samples in decoded pictures. A scalable-nesting SEI message is a message that contains a plurality of SEI messages that correspond to one or more OLSs or one or more layers. A non-scalable-nested SEI message is a message that is not nested and hence contains a single SEI message. A buffering period (BP) SEI message is a SEI message that contains HRD parameters for initializing an HRD to manage a CPB. A picture timing (PT) SEI message is a SEI message that contains HRD parameters for managing delivery information for AUs at the CPB and/or the DPB. A decoding unit information (DUI) SEI message is a SEI message that contains HRD parameters for managing delivery information for DUs at the CPB and/or the DPB.

A CPB removal delay is a period of time that a corresponding current AU can remain in the CPB prior to removal and output to a DPB. An initial CPB removal delay is a default CPB removal delay for each picture, AU, and/or DU in a bitstream, OLS, and/or layer. A CPB removal offset is a location in the CPB used to determine boundaries of a corresponding AU in the CPB. An initial CPB removal offset is a default CPB removal offset associated with each picture, AU, and/or DU in a bitstream, OLS, and/or layer. A decoded picture buffer (DPB) output delay information is a period of time that a corresponding AU can remain in the DPB prior to output. A CPB removal delay information is information related to removal of a corresponding DU from the CPB. A delivery schedule specifies timing for delivery of video data to and/or from a memory location, such as a CPB and/or a DPB. A VPS layer ID (vps_layer_id) is a syntax element that indicates the layer ID of an ith layer indicated in the VPS. A number of output layer sets minus one (num_output_layer_sets_minus1) is a syntax element that specifies the total number of OLSs specified by the VPS. A HRD coded picture buffer count (hrd_cpb_cnt_minus1) is a syntax element that specifies the number of alternative CPB delivery schedules. A sublayer CPB parameters present flag (sublayer_cpb_params_present_flag) is a syntax element that specifies whether a set of OLS HRD parameters includes HRD parameters for specified sublayer representations. A schedule index (ScIdx) is an index that identifies a delivery schedule. A BP CPB count minus1 (bp_cpb_cnt_minus1) is a syntax element that specifies a number of initial CPB remove delay and offset pairs, and hence the number of delivery schedules that are available for a temporal sublayer. A NAL unit header layer identifier (nuh_layer_id) is a syntax element that specifies an identifier of a layer that includes a NAL unit. A fixed picture rate general flag (fixed_pic_rate_general_flag) syntax element is a syntax element that specifics whether a temporal distance between HRD output times of consecutive pictures in output order is constrained. A sublayer HRD parameters (sublayer_hrd_parameters) syntax structure is a syntax structure that includes HRD parameters for a corresponding sublayer. A general VCL HRD parameters present flag (general_vcl_hrd_params_present_flag) is a flag that specifies whether VCL HRD parameters are present in a general HRD parameters syntax structure. A BP maximum sublayers minus one (bp_max_sublayers_minus1) syntax element is a syntax element that specifies the maximum number of temporal sublayers for which CPB removal delay and CPB removal offset are indicated in the BP SEI message. A VPS maximum sublayers minus one (vps_max_sublayers_minus1) syntax element is a syntax element that specifies the maximum number of temporal sublayers that may be present in a layer specified by the VPS. A scalable nesting OLS flag is a flag that specifies whether scalable-nested SEI messages apply to specific OLSs or specific layers. A scalable nesting number of OLSs minus one (num_olss_minus1) is a syntax element that specifies the number of OLSs to which the scalable-nested SEI messages apply. A nesting OLS index (NestingOlsIdx) is a syntax element that specifics the OLS index of the OLS to which the scalable-nested SEI messages apply. A target OLS index (targetOlsIdx) is a variable that identifies the OLS index of a target OLS to be decoded. A total number of OLSs minus one (TotalNumOlss-1) is a syntax element that specifies a total number of OLSs specified in a VPS.

The following acronyms are used herein, Access Unit (AU), Coding Tree Block (CTB), Coding Tree Unit (CTU), Coding Unit (CU), Coded Layer Video Sequence (CLVS), Coded Layer Video Sequence Start (CLVSS), Coded Video Sequence (CVS), Coded Video Sequence Start (CVSS), Joint Video Experts Team (JVET), Hypothetical Reference Decoder (HRD), Motion Constrained Tile Set (MCTS), Maximum Transfer Unit (MTU), Network Abstraction Layer (NAL), Output Layer Set (OLS), Picture Order Count (POC), Random Access Point (RAP), Raw Byte Sequence Payload (RBSP), Sequence Parameter Set (SPS), Video Parameter Set (VPS), Versatile Video Coding (VVC).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-O2001-v14.

Video coding systems employ various conformance tests to ensure a bitstream is decodable by a decoder. For example, a conformance check may include testing the entire bitstream for conformance, then testing each layer of the bitstream for conformance, and finally checking potential decodable outputs for conformance. In order to implement conformance checks, corresponding parameters are included in the bitstream. A hypothetical reference decoder (HRD) can read the parameters and perform the tests. A video may include many layers and many different output layer sets (OLSs). Upon request, the encoder transmits one or more layers of a selected OLS. For example, the encoder may transmit the best layer(s) from an OLS that can be supported by the current network bandwidth. A first problem with this approach is that a significant number of layers are tested, but not actually transmitted to the decoder. However, the parameters to support such testing may still be included in the bitstream, which needlessly increases the bitstream size.

In a first example, disclosed herein is a mechanism to apply bitstream conformance tests to each OLS only. In this way, the entire bitstream, each layer, and the decodable outputs are collectively tested when the corresponding OLS is tested. Therefore, the number of conformance tests is reduced, which reduces processor and memory resource usage at the encoder. Further, reducing the number of conformance tests may reduce the number of associated parameters included in the bitstream. This decreases bitstream size, and hence reduces processor, memory, and/or network resource utilization at both the encoder and the decoder.

A second problem is that the HRD parameter signaling process used for HRD conformance testing in some video coding systems can become complicated in the multi-layer context. For example, a set of HRD parameters can be signaled for each layer in each OLS. Such HRD parameters can be signaled in different locations in the bitstream depending on the intended scope of the parameters. This results in a scheme that becomes more complicated as more layers and/or OLSs are added. Further, the HRD parameters for different layers and/or OLSs may contain redundant information.

In a second example, disclosed herein is a mechanism for signaling a global set of HRD parameters for OLSs and corresponding layers. For example, all sequence-level HRD parameters that apply to all OLSs and all layers contained in the OLSs are signaled in a video parameter set (VPS). The VPS is signaled once in the bitstream, and therefore the sequence level HRD parameters are signaled once. Further, the sequence-level HRD parameters may be constrained to be the same for all OLSs. In this way, redundant signaling is decreased, which increases coding efficiency. Also, this approach simplifies the HRD process. As a result, processor, memory, and/or network signaling resource usage is reduced at both the encoder and the decoder.

A third problem may occur when video coding systems perform conformance checks on bitstreams. Video may be coded into multiple layers and/or sublayers, which can then be organized into OLSs. Each layer and/or sublayer of each OLS is checked for conformance according to delivery schedules. Each delivery schedule is associated with a different coded picture buffer (CPB) size and CPB delay to account for different transmission bandwidths and system capabilities. Some video coding systems allow each sublayer to define any number of delivery schedules. This may result in a large amount of signaling to support conformance checks, which results in reduced coding efficiency for the bitstream.

In a third example, disclosed herein are mechanisms for increasing coding efficiency for video including multiple layers. Specifically, all layers and/or sub-layers are constrained to include the same number of CPB delivery schedules. For example, the encoder can determine the maximum number of CPB delivery schedules used for any one layer and set the number of CPB delivery schedules for all layers to the maximum number. The number of delivery schedules may then be signaled once, for example as part of the HRD parameters in a VPS. This avoids a need to signal a number of schedules for each layer/sublayer. In some examples, all layers/sublayers in an OLS can also share the same delivery schedule index. These changes reduce the amount of data used to signal data related to conformance checking. This decreases bitstream size, and hence reduces processor, memory, and/or network resource utilization at both the encoder and the decoder.

A fourth problem may occur when video is coded into multiple layers and/or sublayers, which are then organized into OLSs. The OLSs may include a zeroth (0-th) OLS that includes only an output layer. Supplemental enhancement information (SEI) messages may be included in the bitstream to inform a HRD of layer/OLS specific parameters used to test the layers of the bitstream for conformance to standards. Specifically, scalable nesting SEI messages are employed when OLSs are included in the bitstream. A scalable nesting SEI message contains groups of nested SEI messages that apply to one or more OLS and/or one or more layers of an OLS. The nested SEI messages may each contain an indicator to indicate an association with a corresponding OLS and/or layer. A nested SEI message is configured for use with multiple layers and may contain extraneous information when applied to a 0-th OLS containing a single layer.

In a fourth example, disclosed herein is a mechanism for increasing coding efficiency for video including a 0-th OLS. A non-scalable-nested SEI message is employed for the 0-th OLS. The non-scalable-nested SEI message is constrained to apply only to the 0-th OLS and hence only to the output layer contained in the 0-th OLS. In this way, the extraneous information, such as nesting relationships, layer indications, etc., can be omitted from the SEI message. The non-scalable-nested SEI message may be used as a buffering period (BP) SEI message, a picture timing (PT) SEI message, a decoding unit (DU) SEI message, or combinations thereof. These changes reduce the amount of data used to signal conformance checking related information for the 0-th OLS. This decreases bitstream size, and hence reduces processor, memory, and/or network resource utilization at both the encoder and the decoder.

A fifth problem may also occur when video is separated into multiple layers and/or sublayers. An encoder can encode these layers into a bitstream. Further, the encoder may employ a HRD to perform conformance tests in order to check the bitstream for conformance with standards. The encoder may be configured to include layer-specific HRD parameters into the bitstream to support such conformance tests. The layer-specific HRD parameters may be encoded for each layer in some video coding systems. In some cases, the layer-specific HRD parameters are the same for each layer, which results in redundant information that unnecessarily increases the size of the video encoding.

In a fifth example, disclosed herein are mechanisms to reduce HRD parameter redundancy for videos that employ multiple layers. The encoder can encode HRD parameters for a highest layer. The encoder can also encode a sublayer CPB parameters present flag (sublayer_cpb_params_present_flag). The sublayer_cpb_params_present_flag can be set to zero to indicate that all lower layers should use the same HRD parameters as the highest layer. In this context, a highest layer has a largest layer identifier (ID) and a lower layer is any layer that has a layer ID that is smaller than the layer ID of the highest layer. In this way, the HRD parameters for the lower layers can be omitted from the bitstream. This decreases bitstream size, and hence reduces processor, memory, and/or network resource utilization at both the encoder and the decoder.

A sixth problem relates to the usage of sequence parameter sets (SPSs) to contain syntax elements related to each video sequence in a video. Video coding systems may code video in layers and/or sublayers. Video sequences may operate differently at different layers and/or sublayers. Hence, different layers may refer to different SPSs. A BP SEI message may indicate the layers/sublayers to be checked for conformance to standards. Some video coding systems may indicate that the BP SEI message applies to the layers/sublayers indicated in the SPS. This may cause problems when different layers have referenced different SPSs as such SPSs may include contradictory information, which results in unexpected errors.

In a sixth example, disclosed herein are mechanisms to address errors relating to conformance checking when multiple layers are employed in a video sequence. Specifically, the BP SEI message is modified to indicate that any number of layers/sublayers described in a VPS may be checked for conformance. For example, the BP SEI message may contain a BP maximum sublayers minus one (bp_max_sublayers_minus1) syntax element that indicates the number of layers/sublayers that are associated with the data in the BP SEI message. Meanwhile, a VPS maximum sublayers minus one (vps_max_sublayers_minus1) syntax element in the VPS indicates the number of sublayers in the entire video. The bp_max_sublayers_minus1 syntax element may be set to any value from zero to the value of the vps_max_sublayers_minus1 syntax element. In this way, any number of layers/sublayers in the video can be checked for conformance while avoiding layer based sequence issues related to SPS inconstancies. Accordingly, the present disclosure avoids layer based coding errors, and hence increases the functionality of an encoder and/or a decoder. Further, the present example supports layer based coding, which may increase coding efficiency. As such, the present example supports reduced processor, memory, and/or network resource usage at an encoder and/or a decoder.

A seventh problem relates to layers that are included in OLSs. Each OLS contains at least one output layer that is configured to be displayed at a decoder. The HRD at the encoder can check each OLS for conformance with standards. A conforming OLS can always be decoded and displayed at a conforming decoder. The HRD process may be managed in part by SEI messages. For example, a scalable nesting SEI message may contain scalable nested SEI messages. Each scalable nested SEI message may contain data that is relevant to a corresponding layer. When performing a conformance check, the HRD may perform a bitstream extraction process on a target OLS. Data that is not relevant to the layers in the OLS are generally removed prior to conformance testing so that each OLS can be checked separately (e.g., prior to transmission). Some video coding systems do not remove scalable nesting SEI messages during the sub-bitstream extraction process because such messages relate to multiple layers. This may result in scalable nesting SEI messages that remain in the bitstream after sub-bitstream extraction even when the scalable nesting SEI messages are not relevant to any layer in the target OLS (the OLS being extracted). This may increase the size of the final bitstream without providing any additional functionality.

In a seventh example, disclosed herein are mechanisms to reduce the size of multi-layer bitstreams. During sub-bitstream extraction, the scalable nesting SEI messages can be considered for removal from the bitstream. When a scalable nesting SEI message relates to one or more OLSs, the scalable nested SEI messages in the scalable nesting SEI message are checked. When the scalable nested SEI messages do not relate to any layer in the target OLS, then the entire scalable nesting SEI message can be removed from the bitstream. This results in reducing the size of the bitstream to be sent to the decoder. Accordingly, the present examples increase coding efficiency and reduce processor, memory, and/or network resource usage at both the encoder and decoder.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and case of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artifacts. Once the frames are filtered, the video signal can be output to a display at step 117 for viewing by an end user.

Figure 2:
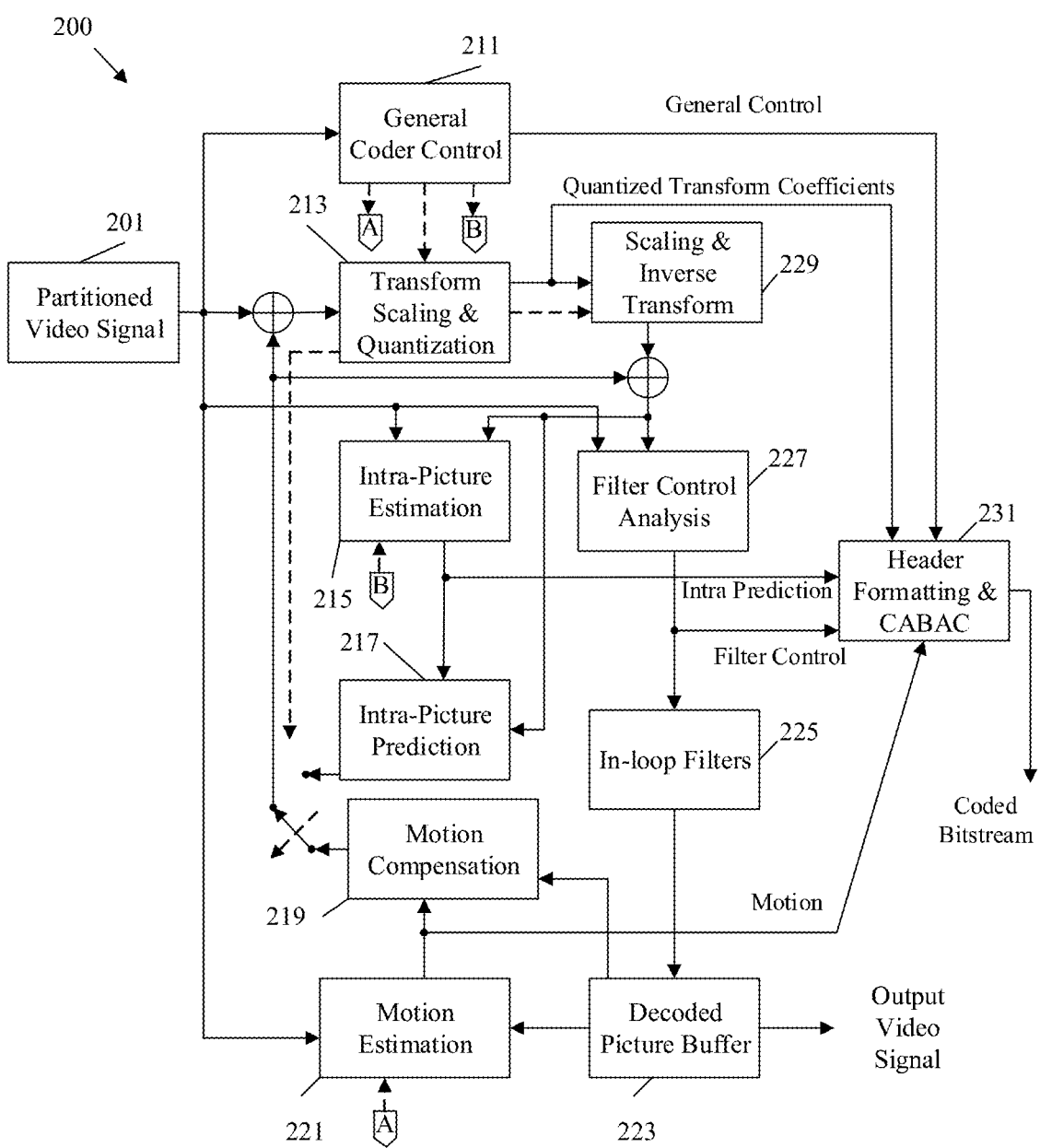
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
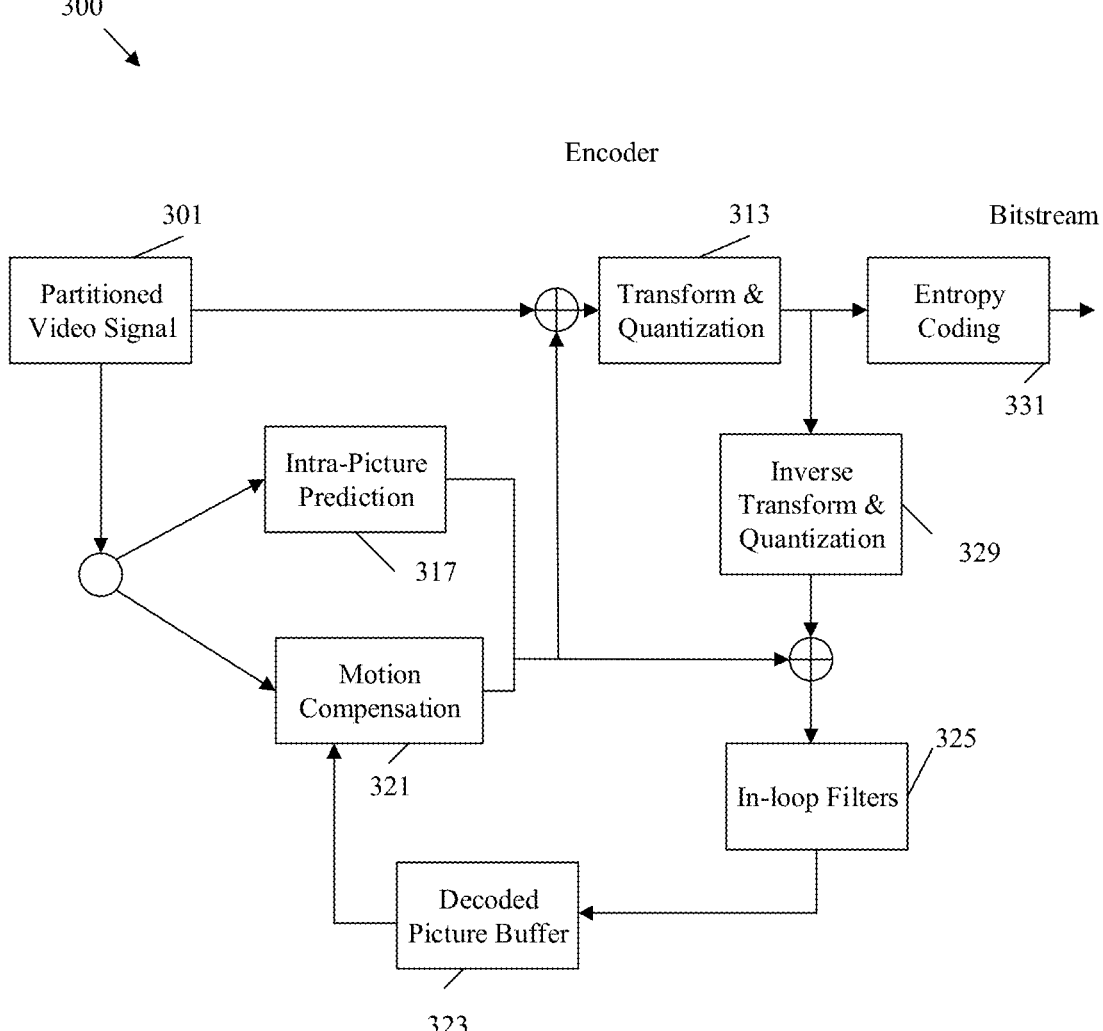
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
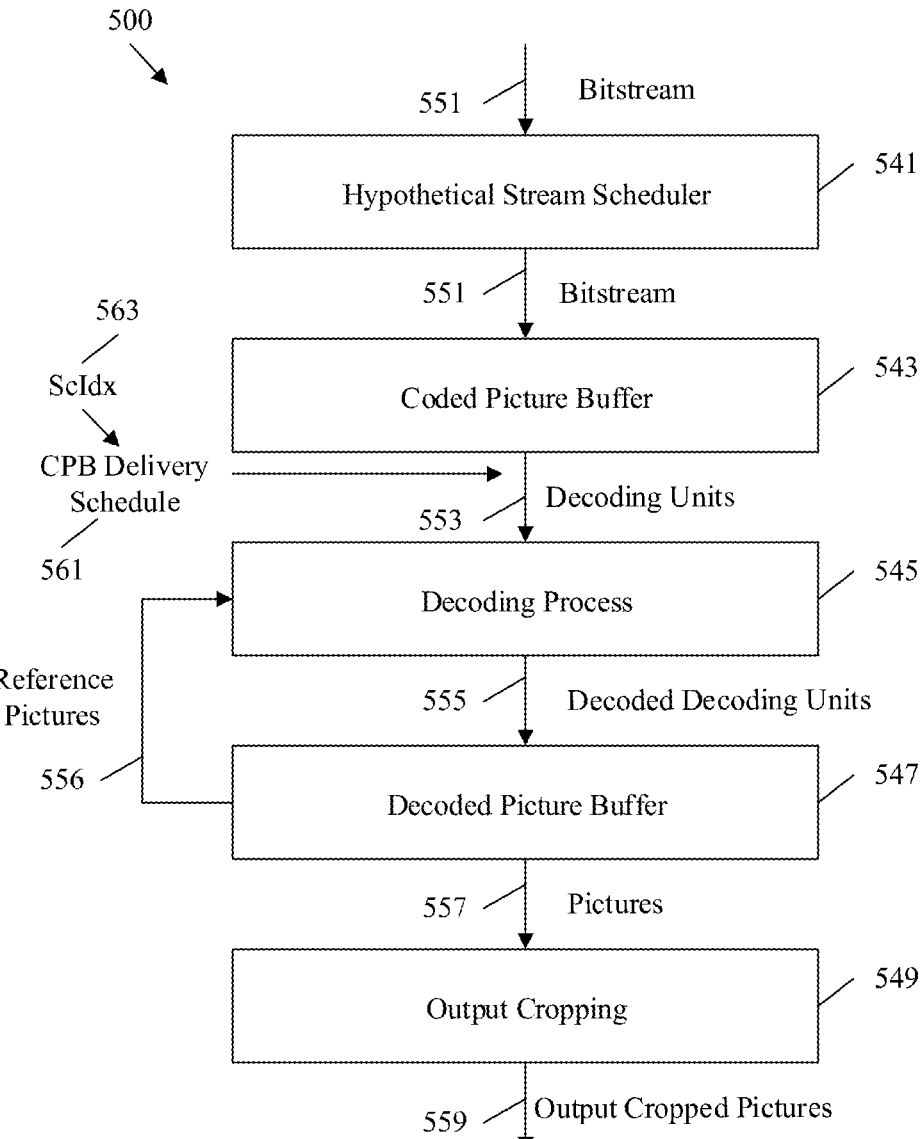
FIG. 5 is a schematic diagram illustrating an example hypothetical reference decoder (HRD).

FIG. 5 is a schematic diagram illustrating an example HRD 500. A HRD 500 may be employed in an encoder, such as codec system 200 and/or encoder 300. The HRD 500 may check the bitstream created at step 109 of method 100 before the bitstream is forwarded to a decoder, such as decoder 400. In some examples, the bitstream may be continuously forwarded through the HRD 500 as the bitstream is encoded. In the event that a portion of the bitstream fails to conform to associated constraints, the HRD 500 can indicate such failure to an encoder to cause the encoder to re-encode the corresponding section of the bitstream with different mechanisms.

The HRD 500 includes a hypothetical stream scheduler (HSS) 541. A HSS 541 is a component configured to perform a hypothetical delivery mechanism. The hypothetical delivery mechanism is used for checking the conformance of a bitstream or a decoder with regards to the timing and data flow of a bitstream 551 input into the HRD 500. For example, the HSS 541 may receive a bitstream 551 output from an encoder and manage the conformance testing process on the bitstream 551. In a particular example, the HSS 541 can control the rate that coded pictures move through the HRD 500 and verify that the bitstream 551 does not contain non-conforming data.

The HSS 541 may forward the bitstream 551 to a CPB 543 at a predefined rate. The HRD 500 may manage data in decoding units (DU) 553. A DU 553 is an AU or a sub-set of an AU and associated non-video coding layer (VCL) network abstraction layer (NAL) units. Specifically, an AU contains one or more pictures associated with an output time. For example, an AU may contain a single picture in a single layer bitstream, and may contain a picture for each layer in a multi-layer bitstream. Each picture of an AU may be divided into slices that are each included in a corresponding VCL NAL unit. Hence, a DU 553 may contain one or more pictures, one or more slices of a picture, or combinations thereof. Also, parameters used to decode the AU, pictures, and/or slices can be included in non-VCL NAL units. As such, the DU 553 contains non-VCL NAL units that contain data needed to support decoding the VCL NAL units in the DU 553. The CPB 543 is a first-in first-out buffer in the HRD 500. The CPB 543 contains DUs 553 including video data in decoding order. The CPB 543 stores the video data for use during bitstream conformance verification.

The CPB 543 forwards the DUs 553 to a decoding process component 545. The decoding process component 545 is a component that conforms to the VVC standard. For example, the decoding process component 545 may emulate a decoder 400 employed by an end user. The decoding process component 545 decodes the DUs 553 at a rate that can be achieved by an example end user decoder. If the decoding process component 545 cannot decode the DUs 553 fast enough to prevent an overflow of the CPB 543, then the bitstream 551 does not conform to the standard and should be re-encoded.

The decoding process component 545 decodes the DUs 553, which creates decoded DUs 555. A decoded DU 555 contains a decoded picture. The decoded DUs 555 are forwarded to a DPB 547. The DPB 547 may be substantially similar to a decoded picture buffer component 223, 323, and/or 423. To support inter-prediction, pictures that are marked for use as reference pictures 556 that are obtained from the decoded DUs 555 are returned to the decoding process component 545 to support further decoding. The DPB 547 outputs the decoded video sequence as a series of pictures 557. The pictures 557 are reconstructed pictures that generally mirror pictures encoded into the bitstream 551 by the encoder.

The pictures 557 are forwarded to an output cropping component 549. The output cropping component 549 is configured to apply a conformance cropping window to the pictures 557. This results in output cropped pictures 559. An output cropped picture 559 is a completely reconstructed picture. Accordingly, the output cropped picture 559 mimics what an end user would see upon decoding the bitstream 551. As such, the encoder can review the output cropped pictures 559 to ensure the encoding is satisfactory.

The HRD 500 is initialized based on HRD parameters in the bitstream 551. For example, the HRD 500 may read HRD parameters from a VPS, a SPS, and/or SEI messages. The HRD 500 may then perform conformance testing operations on the bitstream 551 based on the information in such HRD parameters. As a specific example, the HRD 500 may determine one or more CPB delivery schedules 561 from the HRD parameters. A delivery schedule specifies timing for delivery of video data to and/or from a memory location, such as a CPB and/or a DPB. Hence, a CPB delivery schedule 561 specifies timing for delivery of AUs, DUs 553, and/or pictures, to/from the CPB 543. For example, the CPB delivery schedule 561 may describe bit rates and buffer sizes for the CPB 543, where such bit rates and buffer sizes corresponding to a particular class of decoder and/or network condition. Hence, the CPB delivery schedule 561 may indicate how long data can remain in a CPB 543 prior to eviction. Failure to maintain the CPB delivery schedule 561 at the HRD 500 during a conformance test is an indication that a decoder that corresponds to the CPB delivery schedule 561 would be unable to decode a corresponding bitstream. It should be noted that the HRD 500 may employ DPB delivery schedules for the DPB 547 that are similar to the CPB delivery schedules 561.

Video may be coded into different layers and/or OLSs for use by decoders with varying levels of hardware capabilities as well for varying network conditions. The CPB delivery schedules 561 are selected to reflect these issues. Accordingly, higher layer sub-bitstreams are designated for optimal hardware and network conditions and hence higher layers may receive one or more CPB delivery schedules 561 that employ a large amount of memory in the CPB 543 and short delays for transfers of the DUs 553 toward the DPB 547. Likewise, lower layer sub-bitstreams are designated for limited decoder hardware capabilities and/or poor network conditions. Hence, lower layers may receive one or more CPB delivery schedules 561 that employ a small amount of memory in the CPB 543 and longer delays for transfers of the DUs 553 toward the DPB 547. The OLSs, layers, sublayers, or combinations thereof can then be tested according to the corresponding delivery schedule 561 to ensure that the resulting sub-bitstream can be correctly decoded under the conditions that are expected for the sub-bitstream. The CPB delivery schedules 561 are each associated with a schedule index (ScIdx) 563. A ScIdx 563 is an index that identifies a delivery schedule. Accordingly, the HRD parameters in the bitstream 551 can indicate the CPB delivery schedules 561 by ScIdx 563 as well as include sufficient data to allow the HRD 500 to determine the CPB delivery schedules 561 and correlate the CPB delivery schedules 561 to the corresponding OLSs, layers, and/or sublayers.

Figure 6:
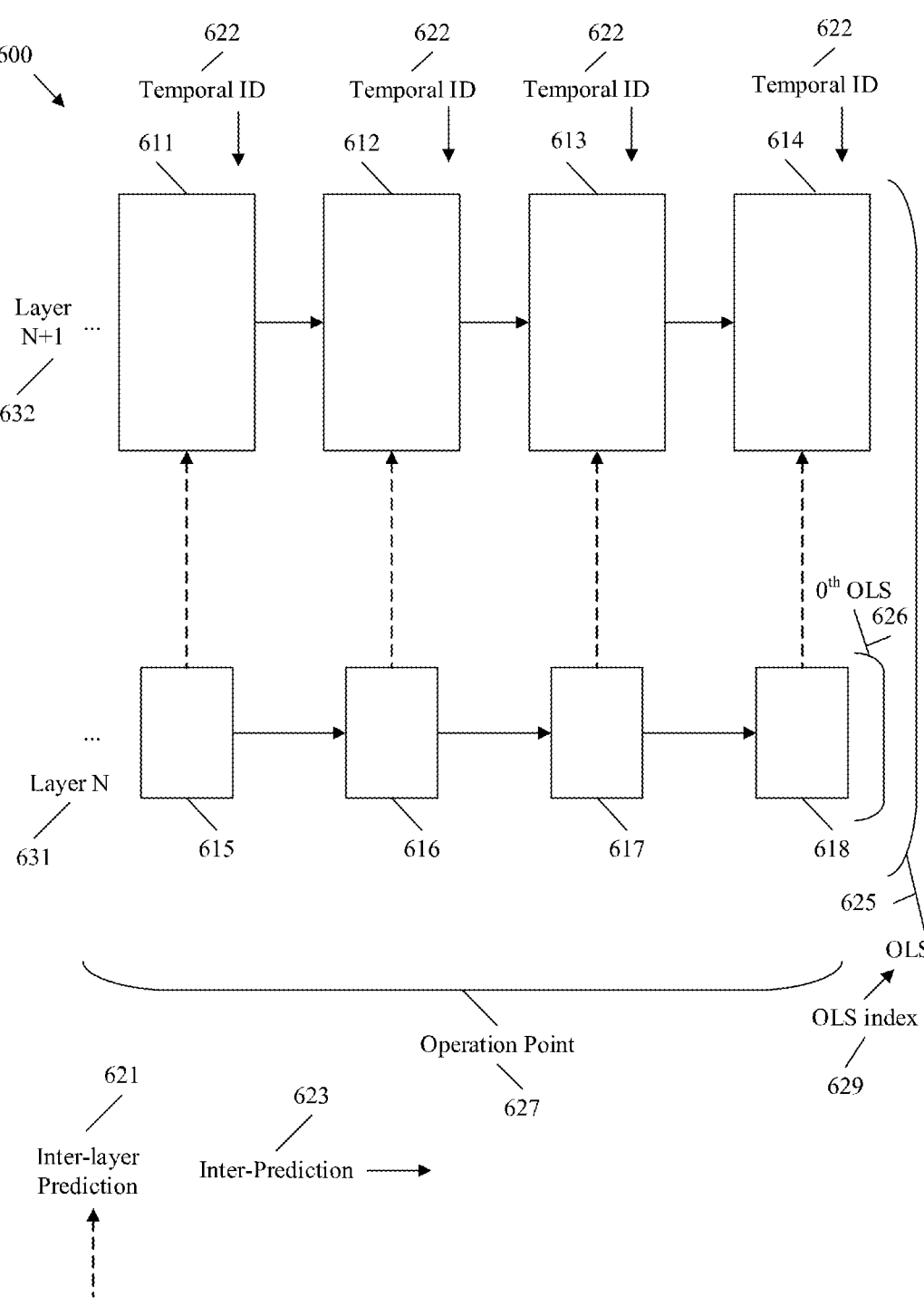
FIG. 6 is a schematic diagram illustrating an example multi-layer video sequence configured for inter-layer prediction.

FIG. 6 is a schematic diagram illustrating an example multi-layer video sequence 600 configured for inter-layer prediction 621. The multi-layer video sequence 600 may be encoded by an encoder, such as codec system 200 and/or encoder 300 and decoded by a decoder, such as codec system 200 and/or decoder 400, for example according to method 100. Further, the multi-layer video sequence 600 can be checked for standard conformance by a HRD, such as HRD 500. The multi-layer video sequence 600 is included to depict an example application for layers in a coded video sequence. A multi-layer video sequence 600 is any video sequence that employs a plurality of layers, such as layer N 631 and layer N+1 632.

In an example, the multi-layer video sequence 600 may employ inter-layer prediction 621. Inter-layer prediction 621 is applied between pictures 611, 612, 613, and 614 and pictures 615, 616, 617, and 618 in different layers. In the example shown, pictures 611, 612, 613, and 614 are part of layer N+1 632 and pictures 615, 616, 617, and 618 are part of layer N 631. A layer, such as layer N 631 and/or layer N+1 632, is a group of pictures that are all associated with a similar value of a characteristic, such as a similar size, quality, resolution, signal to noise ratio, capability, etc. A layer may be defined formally as a set of VCL NAL units and associated non-VCL NAL units. A VCL NAL unit is a NAL unit coded to contain video data, such as a coded slice of a picture. A non-VCL NAL unit is a NAL unit that contains non-video data such as syntax and/or parameters that support decoding the video data, performance of conformance checking, or other operations.

In the example show, layer N+1 632 is associated with a larger image size than layer N 631. Accordingly, pictures 611, 612, 613, and 614 in layer N+1 632 have a larger picture size (e.g., larger height and width and hence more samples) than pictures 615, 616, 617, and 618 in layer N 631 in this example. However, such pictures can be separated between layer N+1 632 and layer N 631 by other characteristics. While only two layers, layer N+1 632 and layer N 631, are shown, a set of pictures can be separated into any number of layers based on associated characteristics. Layer N+1 632 and layer N 631 may also be denoted by a layer ID. A layer ID is an item of data that is associated with a picture and denotes the picture is part of an indicated layer. Accordingly, each picture 611-618 may be associated with a corresponding layer ID to indicate which layer N+1 632 or layer N 631 includes the corresponding picture. For example, a layer ID may include a NAL unit header layer identifier (nuh_layer_id), which is a syntax element that specifies an identifier of a layer that includes a NAL unit (e.g., that include slices and/or parameters of the pictures in a layer). A layer associated with a lower quality/bitstream size, such as layer N 631, is generally assigned a lower layer ID and is referred to as a lower layer. Further, a layer associated with a higher quality/bitstream size, such as layer N+1 632, is generally assigned a higher layer ID and is referred to as a higher layer.

Pictures 611-618 in different layers 631-632 are configured to be displayed in the alternative. As such, pictures in different layers 631-632 can share a temporal ID 622 as long as the pictures are included in the same AU. A temporal ID 622 is a data element that indicates data corresponds to temporal location in a video sequence. An AU is a set of NAL units that are associated with each other according to a specified classification rule and pertain to one particular output time. For example, an AU may include one or more pictures in different layers, such as picture 611 and picture 615 when such pictures are associated with the same temporal ID 622. As a specific example, a decoder may decode and display picture 615 at a current display time if a smaller picture is desired or the decoder may decode and display picture 611 at the current display time if a larger picture is desired. As such, pictures 611-614 at higher layer N+1 632 contain substantially the same image data as corresponding pictures 615-618 at lower layer N 631 (notwithstanding the difference in picture size). Specifically, picture 611 contains substantially the same image data as picture 615, picture 612 contains substantially the same image data as picture 616, etc.

Pictures 611-618 can be coded by reference to other pictures 611-618 in the same layer N 631 or N+1 632. Coding a picture in reference to another picture in the same layer results in inter-prediction 623. Inter-prediction 623 is depicted by solid line arrows. For example, picture 613 may be coded by employing inter-prediction 623 using one or two of pictures 611, 612, and/or 614 in layer N+1 632 as a reference, where one picture is referenced for unidirectional inter-prediction and/or two pictures are referenced for bidirectional inter-prediction. Further, picture 617 may be coded by employing inter-prediction 623 using one or two of pictures 615, 616, and/or 618 in layer N 531 as a reference, where one picture is referenced for unidirectional inter-prediction and/or two pictures are referenced for bidirectional inter-prediction. When a picture is used as a reference for another picture in the same layer when performing inter-prediction 623, the picture may be referred to as a reference picture. For example, picture 612 may be a reference picture used to code picture 613 according to inter-prediction 623. Inter-prediction 623 can also be referred to as intra-layer prediction in a multi-layer context. As such, inter-prediction 623 is a mechanism of coding samples of a current picture by reference to indicated samples in a reference picture that is different from the current picture where the reference picture and the current picture are in the same layer.

Pictures 611-618 can also be coded by reference to other pictures 611-618 in different layers. This process is known as inter-layer prediction 621, and is depicted by dashed arrows. Inter-layer prediction 621 is a mechanism of coding samples of a current picture by reference to indicated samples in a reference picture where the current picture and the reference picture are in different layers and hence have different layer IDs. For example, a picture in a lower layer N 631 can be used as a reference picture to code a corresponding picture at a higher layer N+1 632. As a specific example, picture 611 can be coded by reference to picture 615 according to inter-layer prediction 621. In such a case, the picture 615 is used as an inter-layer reference picture. An inter-layer reference picture is a reference picture used for inter-layer prediction 621. In most cases, inter-layer prediction 621 is constrained such that a current picture, such as picture 611, can only use inter-layer reference picture(s) that are included in the same AU and that are at a lower layer, such as picture 615. When multiple layers (e.g., more than two) are available, inter-layer prediction 621 can encode/decode a current picture based on multiple inter-layer reference picture(s) at lower levels than the current picture.

A video encoder can employ a multi-layer video sequence 600 to encode pictures 611-618 via many different combinations and/or permutations of inter-prediction 623 and inter-layer prediction 621. For example, picture 615 may be coded according to intra-prediction. Pictures 616-618 can then be coded according to inter-prediction 623 by using picture 615 as a reference picture. Further, picture 611 may be coded according to inter-layer prediction 621 by using picture 615 as an inter-layer reference picture. Pictures

612-614 can then be coded according to inter-prediction 623 by using picture 611 as a reference picture. As such, a reference picture can serve as both a single layer reference picture and an inter-layer reference picture for different coding mechanisms. By coding higher layer N+1 632 pictures based on lower layer N 631 pictures, the higher layer N+1 632 can avoid employing intra-prediction, which has much lower coding efficiency than inter-prediction 623 and inter-layer prediction 621. As such, the poor coding efficiency of intra-prediction can be limited to the smallest/lowest quality pictures, and hence limited to coding the smallest amount of video data. The pictures used as reference pictures and/or inter-layer reference pictures can be indicated in entries of reference picture list(s) contained in a reference picture list structure.

In order to perform such operations, layers such as layer N 631 and layer N+1 632 may be included in one or more OLSs 625 and 626. Specifically, pictures 611-618 are encoded as layers 631-632 in the bitstream 600, and then each layer 631-632 of pictures is assigned to one or more of the OLSs 625 and 626. The OLS 625 and/or 626 can then be selected and corresponding layers 631 and/or 632 can be transmitted to a decoder, depending on the capabilities at the decoder and/or network conditions. An OLS 625 is a set of layers for which one or more layers are specified as an output layer. An output layer is a layer that is designated for output (e.g., to a display). For example, layer N 631 may be included solely to support inter-layer prediction 621 and may never be output. In such a case, layer N+1 632 is decoded based on layer N 631 and is output. In such a case, the OLS 625 includes layer N+1 632 as the output layer. When an OLS contains only an output layer, the OLS is referred to as a 0-th OLS 626. A 0-th OLS 626 is an OLS that contains only a lowest layer (layer with a lowest layer identifier) and hence contains only an output layer. In other cases, an OLS 625 may contain many layers in different combinations. For example, an output layer in an OLS 625 can be coded according to inter-layer prediction 621 based on a one, two, or many lower layers. Further, an OLS 625 may contain more than one output layer. Hence, an OLS 625 may contain one or more output layers and any supporting layers needed to reconstruct the output layers. While only two OLSs 625 and 626 are shown, a multi-layer video sequence 600 can be coded by employing many different OLSs 625 and/or 626 that each employ different combinations of the layers. The OLSs 625 and 626 are each associated with an OLS index 629, which is an index that uniquely identifies a corresponding OLS 625 and 626.

Checking a multi-layer video sequence 600 for standards conformance at a HRD 500 can become complicated depending on the number of layers 631-632 and OLSs 625 and 626. A HRD 500 may segregate the multi-layer video sequence 600 into a sequence of operation points 627 for testing. An OLS 625 and/or 626 is identified by an OLS index 629. An operation point 627 is a temporal subset of an OLS 625/626. The operation point 627 can be identified by both the OLS index 629 of the corresponding OLS 625/626 as well as a highest temporal ID 622. As a specific example, a first operation point 627 could include all pictures in a first OLS 625 from temporal ID zero to temporal ID two hundred, a second operation point 627 could include all pictures in the first OLS 625 from temporal ID two hundred and one to temporal ID four hundred, etc. In such a case, the first operation point 627 is described by an OLS index 629 of the first OLS 625 and a temporal ID of two hundred. Further, the second operation point 627 is described by an OLS index 629 of the first OLS 625 and a temporal ID of four hundred.

The operation point 627 selected for testing at a specified instant is referred to as an OP under test (targetOp). Hence, a targetOp is an operation point 627 that is selected for conformance testing at a HRD 500.

Figure 7:
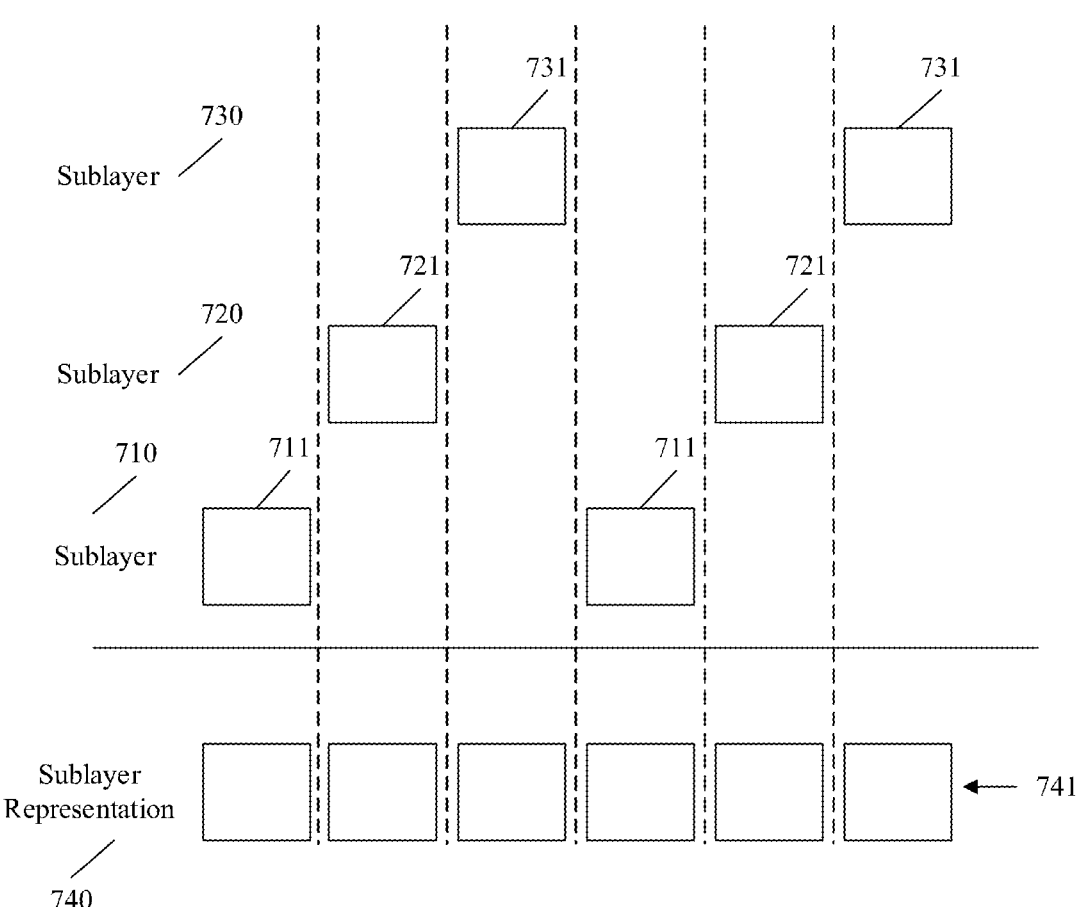
FIG. 7 is a schematic diagram illustrating an example multi-layer video sequence configured for temporal scalability.

FIG. 7 is a schematic diagram illustrating an example multi-layer video sequence 700 configured for temporal scalability. The multi-layer video sequence 700 may be encoded by an encoder, such as codec system 200 and/or encoder 300 and decoded by a decoder, such as codec system 200 and/or decoder 400, for example according to method 100. Further, the multi-layer video sequence 700 can be checked for standard conformance by a HRD, such as HRD 500. The multi-layer video sequence 700 is included to depict another example application for layers in a coded video sequence. For example, the multi-layer video sequence 700 may be employed as a separate embodiment or may be combined with the techniques described with respect to the multi-layer video sequence 600.

The multi-layer video sequence 700 includes sublayers 710, 720, and 730. A sublayer is a temporal scalable layer of a temporal scalable bitstream that includes VCL NAL units (e.g., pictures) with a particular temporal identifier value as well as associated non-VCL NAL units (e.g., supporting parameters). For example, a layer, such as a layer N 631 and/or layer N+1 632, can be further divided into sublayers 710, 720, and 730 to support temporal scalability. The sublayer 710 may be referred to as a base layer and sublayers 720 and 730 may be referred to as enhancement layers. As shown, the sublayer 710 includes pictures 711 at a first frame rate, such as thirty frames per second. The sublayer 710 is a base layer because the sublayer 710 includes the base/lowest frame rate. The sublayer 720 contains pictures 721 that are temporally offset from the pictures 711 of sublayer 710. The result is that sublayer 710 and sublayer 720 can be combined, which results in a frame rate that is collectively higher than the frame rate of the sublayer 710 alone. For example, sublayer 710 and 720 may have a combined frame rate of sixty frames per second. Accordingly, the sublayer 720 enhances the frame rate of the sublayer 710. Further, sublayer 730 contains pictures 731 that are also temporally offset from the pictures 721 and 711 of sublayers 720 and 710. As such, the sublayer 730 can be combined with sublayers 720 and 710 to further enhance the sublayer 710. For example, the sublayers 710, 720, and 730 may have a combined frame rate of ninety frames per second.

A sublayer representation 740 can be dynamically created by combining sublayers 710, 720, and/or 730. A sublayer representation 740 is a subset of a bitstream containing NAL units of a particular sublayer and the lower sublayers. In the example shown, the sublayer representation 740 contains pictures 741, which are the combined pictures 711, 721, and 731 of sublayers 710, 720, and 730. Accordingly, the multi-layer video sequence 700 can be temporally scaled to a desired frame rate by selecting a sublayer representation 740 that includes a desired set of sublayers 710, 720, and/or 730. A sublayer representation 740 may be created by employing an OLS that includes sublayer 710, 720, and/or 730 as layers. In such a case, the sublayer representation 740 is selected as an output layer. As such, temporal scalability is one of several mechanisms that can be accomplished using multi-layer mechanisms.

Figure 8:
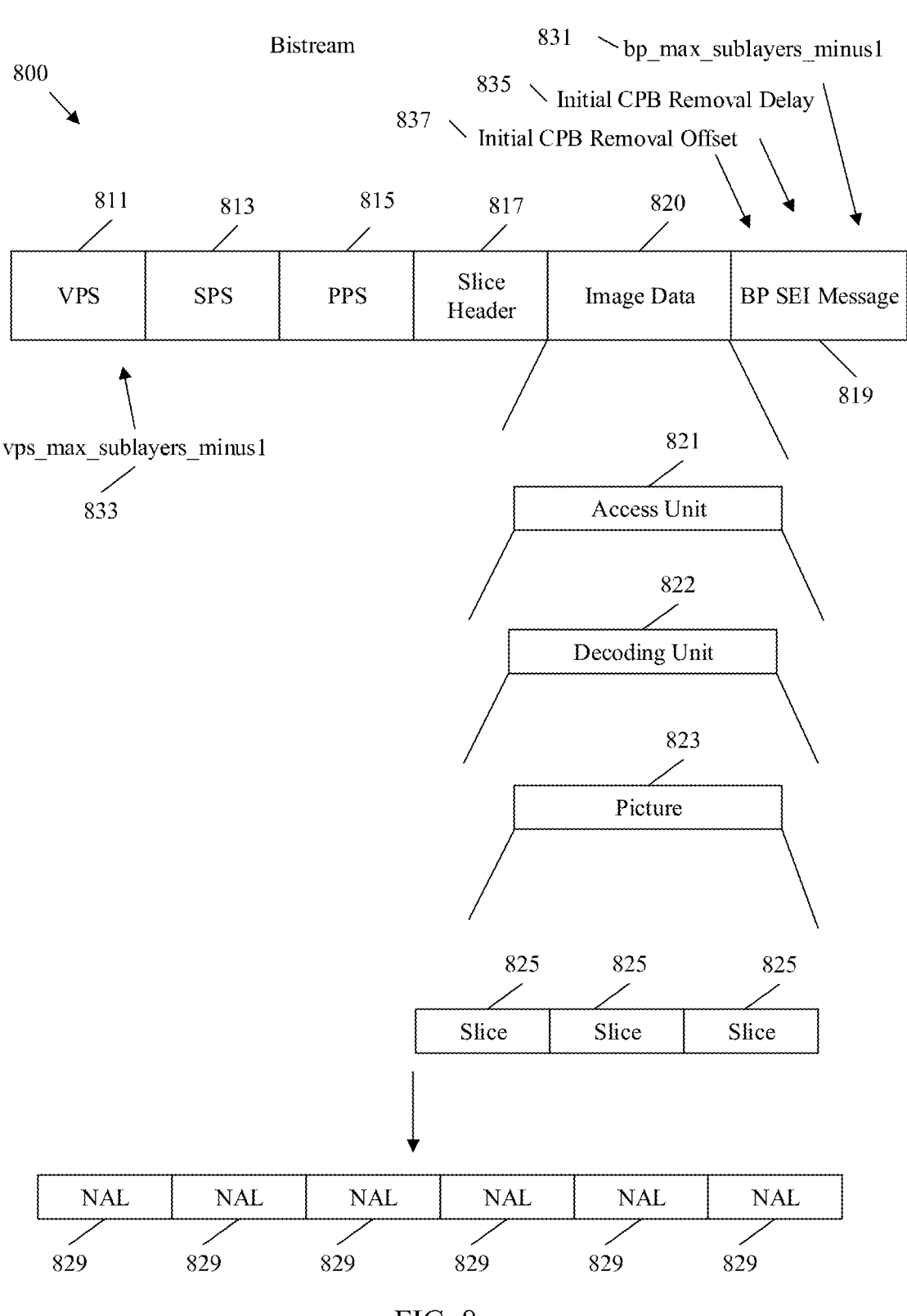
FIG. 8 is a schematic diagram illustrating an example bitstream.

FIG. 8 is a schematic diagram illustrating an example bitstream 800. For example, the bitstream 800 can be generated by a codec system 200 and/or an encoder 300 for decoding by a codec system 200 and/or a decoder 400 according to method 100. Further, the bitstream 800 may include a multi-layer video sequence 600 and/or 700. In addition, the bitstream 800 may include various parameters to control the operation of a HRD, such as HRD 500. Based on such parameters, the HRD can check the bitstream 800 for conformance with standards prior to transmission toward a decoder for decoding.

The bitstream 800 includes a VPS 811, one or more SPSs 813, a plurality of picture parameter sets (PPSs) 815, a plurality of slice headers 817, image data 820, and a BP SEI message 819. A VPS 811 contains data related to the entire bitstream 800. For example, the VPS 811 may contain data related OLSs, layers, and/or sublayers used in the bitstream 800. An SPS 813 contains sequence data common to all pictures in a coded video sequence contained in the bitstream 800. For example, each layer may contain one or more coded video sequences, and each coded video sequence may reference a SPS 813 for corresponding parameters. The parameters in a SPS 813 can include picture sizing, bit depth, coding tool parameters, bit rate restrictions, etc. It should be noted that, while each sequence refers to a SPS 813, a single SPS 813 can contain data for multiple sequences in some examples. The PPS 815 contains parameters that apply to an entire picture. Hence, each picture in the video sequence may refer to a PPS 815. It should be noted that, while each picture refers to a PPS 815, a single PPS 815 can contain data for multiple pictures in some examples. For example, multiple similar pictures may be coded according to similar parameters. In such a case, a single PPS 815 may contain data for such similar pictures. The PPS 815 can indicate coding tools available for slices in corresponding pictures, quantization parameters, offsets, etc.

The slice header 817 contains parameters that are specific to each slice in a picture. Hence, there may be one slice header 817 per slice in the video sequence. The slice header 817 may contain slice type information, POCs, reference picture lists, prediction weights, tile entry points, deblocking parameters, etc. It should be noted that in some examples, a bitstream 800 may also include a picture header, which is a syntax structure that contains parameters that apply to all slices in a single picture. For this reason, a picture header and a slice header 817 may be used interchangeably in some contexts. For example, certain parameters may be moved between the slice header 817 and a picture header depending on whether such parameters are common to all slices in a picture.

The image data 820 contains video data encoded according to inter-prediction and/or intra-prediction as well as corresponding transformed and quantized residual data. For example, the image data 820 may include AUs 821, DUs 822, and/or pictures 823. An AU 821 is a set of NAL units that are associated with each other according to a specified classification rule and pertain to one particular output time. A DU 822 is an AU or a sub-set of an AU and associated non-VCL NAL units. A picture 823 is an array of luma samples and/or an array of chroma samples that create a frame or a field thereof. In plain language, an AU 821 contains various video data that may be displayed at a specified instant in a video sequence as well as supporting syntax data. Hence, an AU 821 may contain a single picture 823 in a single layer bitstream or multiple pictures from multiple layers that are all associated with the same instant in a multi-layer bitstream. Meanwhile, a picture 823 is a coded image that may be output for display or used to support coding of other picture(s) 823 for output. A DU 822 may contain one or more pictures 823 and any supporting syntax data needed for decoding. For example, a DU 822 and an AU 821 may be used interchangeably in simple bitstreams (e.g., when an AU contains a single picture).

However, in more complex multi-layer bitstreams, a DU 822 may only contain a portion of the video data from an AU 821. For example, an AU 821 may contain pictures 823 at several layers and/or sublayers where some of the pictures 823 are associated with different OLSs. In such a case, a DU 822 may only contain picture(s) 823 from a specified OLS and/or a specified layer/sublayer.

A picture 823 contains one or more slices 825. A slice 825 may be defined as an integer number of complete tiles or an integer number of consecutive complete coding tree unit (CTU) rows (e.g., within a tile) of a picture 823, where the tiles or CTU rows are exclusively contained in a single NAL unit 829. Hence, the slice 825 is also contained in a single NAL units 829. The slices 825 are further divided into CTUs and/or coding tree blocks (CTBs). A CTU is a group of samples of a predefined size that can be partitioned by a coding tree. A CTB is a subset of a CTU and contains luma components or chroma components of the CTU. The CTUs/CTBs are further divided into coding blocks based on coding trees. The coding blocks can then be encoded/decoded according to prediction mechanisms.

A bitstream 800 is a sequence of NAL units 829. A NAL unit 829 is a container for video data and/or supporting syntax. A NAL unit 829 can be a VCL NAL unit or a non-VCL NAL unit. A VCL NAL unit is a NAL unit 829 coded to contain video data, such as a coded slice 825 and an associated slice header 817. A non-VCL NAL unit is a NAL unit 829 that contains non-video data such as syntax and/or parameters that support decoding the video data, performance of conformance checking, or other operations. For example, a non-VCL NAL unit can contain a VPS 811, a SPS 813, a PPS 815, a BP SEI message 819, or other supporting syntax.

A SEI message is a syntax structure with specified semantics that conveys information that is not needed by the decoding process in order to determine the values of the samples in decoded pictures. For example, SEI messages may contain data to support HRD processes or other supporting data that is not directly relevant to decoding the bitstream 800 at a decoder. The SEI message used in a bitstream 800 may include scalable-nesting SEI messages and/or non-scalable-nested SEI messages. A scalable-nesting SEI message is a message that contains a plurality of SEI messages that correspond to one or more OLSs or one or more layers. A non-scalable-nested SEI message is a message that is not nested and hence contains a single SEI message. A BP SEI message 819 is a SEI message that contains HRD parameters for initializing an HRD to manage a CPB. SEI messages may also include a PT SEI message that contains HRD parameters for managing delivery information for AUs 821 at the CPB and/or the DPB. SEI messages may also include a DUI SEI message that contains HRD parameters for managing delivery information for DUs 822 at the CPB and/or the DPB.

The BP SEI message 819 may contain data describing the CPB delivery schedules, such as CPB delivery schedule 561, that may be employed when performing conformance tests on the bitstream 800. A delivery schedule may be described by a pair of values describing the timing of the delivery schedule (e.g., how often to remove data) and describing the amount of data to be transferred (e.g., how much data to remove at each occurrence). The BP SEI message 819 indicates the AU or DU that should be the starting point of the conformance check (e.g., an AU 821 or a DU 822) and a data pair indicating the default schedule to use for each data unit. In a specific example, the BP SEI message 819 may include an initial CPB removal delay 835 and an initial CPB removal offset 837. An initial CPB removal delay 835 is a default CPB removal delay for each picture, AU, and/or DU in a bitstream, OLS, and/or layer. An initial CPB removal offset 837 is a default CPB removal offset associated with each picture, AU, and/or DU in a bitstream, OLS, and/or layer. By employing the initial CPB removal delay 835 and the initial CPB removal offset 837 pair, a HRD can determine a CPB delivery schedule to use when removing data units (AUs or DUs) from the CPB during conformance testing.

As noted above, a video stream may include many OLSs and many layers, such as OLS 625, layer N 631, layer N+1 632, sublayer 710, sublayer 720, and/or sublayer 730. Further, some layers may be included in multiple OLSs. As such, a multi-layer video sequence, such as multi-layer video sequence 600 and/or 700, may become quite complicated. This may result in a complicated bitsteam conformance checking process at the HRD. Some video coding systems may correlate the BP SEI message 819 to the SPS 813. For example, such systems may indicate that the BP SEI message 819 applies to the layers/sublayers described by the SPS 813. However, a bitstream 800 may include many different SPSs 813. For example, different layers may be coded differently and hence may employ different SPSs 813 at different relative points in the bitstream 800. This may cause problems when different layers have referenced different SPSs 813 as such SPSs 813 may include contradictory information. For example, the system may be unable to determine which SPS 813 is associated with the BP SEI message 819 without first determining which layers are associated with the BP SEI message 819. Further, the system may be unable to determine which layers are associated with the BP SEI message 819 without first determining which SPS 813 is associated with the BP SEI message 819. Such a system may be unable to resolve this issue, and may return unexpected errors. For example, such a system may be unable to properly initialize the HRD in some scenarios.

The present disclosure includes mechanisms to address errors relating to conformance checking when multiple layers are employed in a video sequence. Specifically, the BP SEI message 819 is modified to indicate that any number of layers/sublayers described in a VPS 811 may be checked for conformance. For example, the BP SEI message 819 may be modified to include a BP maximum sublayers minus one (bp_max_sublayers_minus1) 831 syntax element. The bp_max_sublayers_minus1 831 is a syntax element that specifies the maximum number of temporal sublayers for which an initial CPB removal delay 835 and initial CPB removal offset 837 are indicated in the BP SEI message 819. Accordingly, the bp_max_sublayers_minus1 831 indicates the number of layers/sublayers that are associated with the data in the BP SEI message 819. A HRD may employ the value of the bp_max_sublayers_minus1 831 to determine the correct set of layers/sublayers that are associated with the BP SEI message 819. The HRD may then use the initial CPB removal delay 835 and the initial CPB removal offset 837 to determine CPB delivery schedules to properly perform conformance checks on the layers/sublayers indicated by the bp_max_sublayers_minus1 831.

Further, the VPS 811 can contain a VPS maximum sublayers minus one (vps_max_sublayers_minus1) 833 syntax element. The vps_max_sublayers_minus1 833 is a syntax element that specifies the maximum number of temporal sublayers that may be present in a layer specified by the VPS 811. Accordingly, the vps_max_sublayers_minus1 833 may indicate the number of sublayers in the entire video. The bp_max_sublayers_minus1 831 may be set to any value from zero to the value of the vps_max_sublayers_minus1 833. In this way, any number of layers/sublayers in the video can be checked for conformance while avoiding layer based sequence issues related to SPS 813 inconstancies. Accordingly, the present disclosure avoids layer based coding errors, and hence increases the functionality of an encoder and/or a decoder. Further, the present example supports layer based coding, which may increase coding efficiency. As such, the present example supports reduced processor, memory, and/or network resource usage at an encoder and/or a decoder.

The preceding information is now described in more detail herein below. Layered video coding is also referred to as scalable video coding or video coding with scalability. Scalability in video coding may be supported by using multi-layer coding techniques. A multi-layer bitstream comprises a base layer (BL) and one or more enhancement layers (ELs). Example of scalabilities includes spatial scalability, quality/signal to noise ratio (SNR) scalability, multi-view scalability, frame rate scalability, etc. When a multi-layer coding technique is used, a picture or a part thereof may be coded without using a reference picture (intra-prediction), may be coded by referencing reference pictures that are in the same layer (inter-prediction), and/or may be coded by referencing reference pictures that are in other layer(s) (inter-layer prediction). A reference picture used for inter-layer prediction of the current picture is referred to as an inter-layer reference picture (ILRP). FIG. 6 illustrates an example of multi-layer coding for spatial scalability in which pictures in different layers have different resolutions.

Some video coding families provide support for scalability in separated profile(s) from the profile(s) for single-layer coding. Scalable video coding (SVC) is a scalable extension of the advanced video coding (AVC) that provides support for spatial, temporal, and quality scalabilities. For SVC, a flag is signaled in each macroblock (MB) in EL pictures to indicate whether the EL MB is predicted using the collocated block from a lower layer. The prediction from the collocated block may include texture, motion vectors, and/or coding modes. Implementations of SVC may not directly reuse unmodified AVC implementations in their design. The SVC EL macroblock syntax and decoding process differs from the AVC syntax and decoding process.

Scalable HEVC (SHVC) is an extension of HEVC that provides support for spatial and quality scalabilities. Multiview HEVC (MV-HEVC) is an extension of HEVC that provides support for multi-view scalability. 3D HEVC (3D-HEVC) is an extension of HEVC that provides support for 3D video coding that is more advanced and more efficient than MV-HEVC. Temporal scalability may be included as an integral part of a single-layer HEVC codec. In the multi-layer extension of HEVC, decoded pictures used for inter-layer prediction come only from the same AU and are treated as long-term reference pictures (LTRPs). Such pictures are assigned reference indices in the reference picture list(s) along with other temporal reference pictures in the current layer. Inter-layer prediction (ILP) is achieved at the prediction unit (PU) level by setting the value of the reference index to refer to the inter-layer reference picture(s) in the reference picture list(s). Spatial scalability resamples a reference picture or part thereof when an ILRP has a different spatial resolution than the current picture being encoded or decoded. Reference picture resampling can be realized at either picture level or coding block level.

VVC may also support layered video coding. A VVC bitstream can include multiple layers. The layers can be all independent from each other. For example, each layer can be coded without using inter-layer prediction. In this case, the layers are also referred to as simulcast layers. In some cases, some of the layers are coded using ILP. A flag in the VPS can indicate whether the layers are simulcast layers or whether some layers use ILP. When some layers use ILP, the layer dependency relationship among layers is also signaled in the VPS. Unlike SHVC and MV-HEVC, VVC may not specify OLSs. An OLS includes a specified set of layers, where one or more layers in the set of layers are specified to be output layers. An output layer is a layer of an OLS that is output. In some implementations of VVC, only one layer may be selected for decoding and output when the layers are simulcast layers. In some implementations of VVC, the entire bitstream including all layers is specified to be decoded when any layer uses ILP. Further, certain layers among the layers are specified to be output layers. The output layers may be indicated to be only the highest layer, all the layers, or the highest layer plus a set of indicated lower layers.

Video coding standards may specify a HRD for verifying the conformance of bitstreams through specified HRD conformance tests. In SHVC and MV-HEVC, three sets of bitstream conformance tests are employed for checking the conformance of a bitstream. The bitstream is referred to as the entire bitstream and denoted as entireBitstream. The first set of bitstream conformance tests are for testing the conformance of the entire bitstream and corresponding temporal subsets. Such tests are employed regardless of whether there is a layer set specified by the active VPS that contains all the nuh_layer_id values of VCL NAL units present in the entire bitstream. Accordingly, the entire bitstream is always checked for conformance even when one or more layers are not included in an output set. The second set of bitstream conformance tests are employed for testing the conformance of the layer sets specified by the active VPS and associated temporal subsets. For all these tests, only the base layer pictures (e.g., pictures with nuh_layer_id equal to zero) are decoded and output. Other pictures are ignored by the decoder when the decoding process is invoked. The third set of bitstream conformance tests are employed for testing the conformance of the OLSs specified by the VPS extension part of the active VPS and associated temporal subsets based on OLSs and bitstream partitions. A bitstream partition includes one or more layers of an OLS of a multi-layer bitstream.

The preceding aspects contain certain problems. For example, the first two sets of conformance tests may be applied to layers that are not decoded and not output. For example, layers other than the lowest layer may not be decoded and may not be output. In real applications, a decoder may receive only the data to be decoded. As such, employing the first two sets of conformance tests both complicates the codec design and may waste bits for carrying both sequence-level and picture-level parameters used to support the conformance tests. The third set of conformance tests involves bitstream partitions. Such partitions may relate to one or more layers of an OLS of a multi-layer bitstream. The HRD may be greatly simplified if conformance tests always operate separately for each layer instead.

The signaling of sequence-level HRD parameters may be complicated. For example, the sequence-level HRD parameters may be signaled in multiple places such as both in the SPS and the VPS. Further, the sequence-level HRD parameters signaling may include redundancy. For example, information that may generally be the same for the entire bitstream can be repeated at each layer of each OLS. In addition, an example HRD scheme allows a different delivery schedule to be selected for each layer. Such delivery schedules may be selected from a list of schedules signaled for each layer for each operation point where an operation point is an OLS or a temporal subset of an OLS. Such a system is complicated. Further, an example HRD scheme allows incomplete AUs to be associated with buffering period SEI messages. An incomplete AU is an AU that does not have pictures for all the layers present in a CVS. However, HRD initialization at such an AU may be problematic. For example, the HRD may not be properly initialized for layers with layer access units that are not present in the incomplete AU. In addition, the demultiplexing process for deriving a layer bitstream may not sufficiently and efficiently remove nested SEI messages that do not apply to the target layer. A layer bitstream occurs when a bitstream partition contains only one layer. Further, the applicable OLS of non-scalable-nested buffering period, picture timing, and decoding unit information SEI messages may be specified for the entire bitstream. However, the non-scalable-nested buffering period should instead be applicable to the 0-th OLS instead.

Further, some VVC implementations may fail to infer HDR parameters when a sub_layer_cpb_params_present_flag is equal to zero. Such an inference may enable proper HRD operations. In addition, the values of bp_max_sub_layers_minus1 and pt_max_sub_layers_minus1 may be required to be equal to the value of sps_max_sub_layers_minus1. However, the buffering period and picture timing SEI messages can be nested and can be applicable to multiple OLSs and multiple layers of each of the multiple OLSs. In such contexts, the layers involved may refer to multiple SPSs. Hence, the system may have difficulty in tracking which SPS is the SPS that corresponds to each layer. Therefore, the values of these two syntax elements should be constrained based on the value of vps_max_sub_layers_minus1 instead. Furthermore, since different layers may have different number of sub-layers, the values of these two syntax elements may not always be equal to a particular value in all the buffering period and picture timing SEI messages.

Also, the following problem is associated with the HRD design in both SHVC/MV-HEVC and VVC. The sub-bitstream extraction process may not remove SEI NAL units containing nested SEI messages that are not needed for the target OLS.

In general, this disclosure describes approaches for scalable nesting of SEI messages for output layer sets in multi-layer video bitstreams. The descriptions of the techniques are based on VVC. However, the techniques also apply to layered video coding based on other video codec specifications.

One or more of the abovementioned problems may be solved as follows. Specifically, this disclosure includes methods for an HRD design and related aspects that allow for efficient signaling of HRD parameters with much simpler HRD operations compared to SHVC and MV-HEVC. Each of the solutions described below corresponds to the problems described above. For example, instead of requiring three sets of conformance tests, the present disclosure may only employ one set of conformance tests for testing the conformance of the OLSs specified by the VPS. Further, instead of a design that is based on bitstream partitions, the disclosed HRD mechanisms may always operate separately for each layer of an OLS. Further, sequence-level HRD parameters that are global for all layers and sub-layers of all OLSs may be signaled only once, for example in the VPS. In addition, a single number of delivery schedules can be signaled for all layers and sub-layers of all OLSs. The same delivery schedule index can also be applied for all layers in an OLS. In addition, incomplete AUs may not be associated with a buffering period SEI message. An incomplete AU is an AU that does not include pictures for all the layers present in a CVS. This ensures that the HRD can always be properly initialized for all layers in an OLS. Also, a mechanism is disclosed for efficiently removing nested SEI messages that do not apply to the target layer in an OLS. This supports the demultiplexing process for deriving a layer bitstream. In addition, the applicable OLS of non-scalable-nested buffering period, picture timing, and decoding unit information SEI messages may be specified to be the 0-th OLS. Further, HDR parameters may be inferred when sub_layer_cpb_params_present_flag is equal to 0, which may enable proper HRD operations. The values of bp_max_sub_layers_minus1 and pt_max_sub_layers_minus1 may be required to be in the range of zero to vps_max_sub_layers_minus1. In this way, such parameters are not required to be a particular value for all the buffering period and picture timing SEI messages. Also, the sub-bitstream extraction process may remove SEI NAL units containing nested SEI messages that do not apply to the target OLS.

An example implementation of the preceding mechanisms is as follows. An output layer is a layer of an output layer set that is output. An OLS is a set of layers including a specified set of layers, where one or more layers in the set of layers are specified to be output layers. An OLS layer index is an index, of a layer in an OLS, to the list of layers in the OLS. A sub-bitstream extraction process is a specified process by which NAL units in a bitstream that do not belong to a target set, determined by a target OLS index and a target highest TemporalId, are removed from the bitstream, with the output sub-bitstream including the NAL units in the bitstream that belong to the target set.

An example video parameter set syntax is as follows.

| | Descriptor |
|---|---|
| video_parameter_set_rbsp( ) { | |
| ... | |
|    general_hrd_params_present_flag | u(1) |
|    if( general_hrd_params_present_flag ) { | |
|       num_units_in_tick | u(32) |
|       time_scale | u(32) |
|       general_hrd_parameters( ) | |
|    } | |
|    vps_extension_flag | u(1) |
|    if( vps_extension_flag ) | |
|      while( more_rbsp_data( ) ) | |
|        vps_extension_data_flag | u(1) |
|    rbsp_trailing_bits( ) | |
| } | |

An example sequence parameter set RBSP syntax is as follows.

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_4bits | u(4) |
|   same_nonoutput_level_and_dpb_size_flag | u(1) |
|   profile_tier_level( 1, sps_max_sub_layers_minus1 ) | |
|   if( !same_nonoutput_level_and_dpb_size_flag ) | |
|     profile_tier_level( 0, sps_max_sub_layers_minus1 ) | |
|   ... | |
|   if( sps_max_sub_layers_minus1 > 0) | |

-continued

| | Descriptor |
|---|---|
| sps_sub_layer_ordering_info_present_flag | u(1) |
| dpb_parameters( 1 ) | |
| if( !same_nonoutput_level_and_dpb_size_flag ) | |
| dpb_parameters( 0 ) | |
| long_term_ref_pics_flag | u(1) |
| ... | |
| sps_scaling_list_enabled_flag | u(1) |
| vui_parameters_present_flag | u(1) |
| if( vui_parameters_present_flag ) | |
| vui_parameters( ) | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

An example DPB parameters syntax is as follows.

| | Descriptor |
|---|---|
| dpb_parameters( reorderMaxLatencyPresentFlag ) { | |
| for( i = ( sps_sub_layer_ordering_info_present_flag ? 0 : sps_max_sub_layers_minus1 ); | |
| i <= sps_max_sub_layers_minus1; i++ ) { | |
| sps_max_dec_pic_buffering_minus1[ i ] | ue(v) |
| if( reorderMaxLatencyPresentFlag ) { | |
| sps_max_num_reorder_pics[ i ] | ue(v) |
| sps_max_latency_increase_plus1[ i ] | ue(v) |
| } | |
| } | |
| } | |

An example general HRD parameters syntax is as follows.

| | Descriptor |
|---|---|
| general_hrd_parameters( ) { | |
| general_nal_hrd_params_present_flag | u(1) |
| general_vcl_hrd_params_present_flag | u(1) |
| if( general_nal_hrd_params_present_flag \|\| general_vcl_hrd_params_present_flag ) { | |
| decoding_unit_hrd_params_present_flag | u(1) |
| if( decoding_unit_hrd_params_present_flag ) { | |
| tick_divisor_minus2 | u(8) |
| decoding_unit_cpb_params_in_pic_timing_sei_flag | u(1) |
| } | |
| bit_rate_scale | u(4) |
| cpb_size_scale | u(4) |
| if( decoding_unit_hrd_params_present_flag ) | |
| cpb_size_du_scale | vu(4) |
| } | |
| if( vps_max_sub_layers_minus1 > 0 ) | |
| sub_layer_cpb_params_present_flag | u(1) |
| if( TotalNumOlss > 1 ) | |
| num_layer_hrd_params_minus1 | ue(v) |
| hrd_cpb_cnt_minus1 | ue(v) |
| for( i = 0; i <= num_layer_hrd_params_minus1; i++ ) { | |
| if( vps_max_sub_layers_minus1 > 0) | |
| hrd_max_temporal_id[ i ] | u(3) |
| layer_level_hrd_parameters( hrd_max_temporal_id[ i ] ) | |
| } | |
| if( num_layer_hrd_params_minus1 > 0) | |
| for( i = 1; i < TotalNumOlss; i++) | |
| for( j = 0; j < NumLayersInOls[ i ]; j++ ) | |
| layer_level_hrd_idx[ i ][ j ] | ue(v) |
| } | |

An example video parameter set RBSP semantics is as follows. The each_layer_is_an_ols_flag is set equal to one to specify that each output layer set contains only one layer and each layer itself in the bitstream is an output layer set with the single included layer being the only output layer. The each_layer_is_an_ols_flag is set equal to zero to specify that an output layer set may contain more than one layer. If vps_max_layers_minus1 is equal to zero, the value of each_layer_is_an_ols_flag is inferred to be equal to one. Otherwise, when vps_all_independent_layers_flag is equal to zero, the value of each_layer_is_an_ols_flag is inferred to be equal to zero.

The ols_mode_idc is set equal to zero to specify that the total number of OLSs specified by the VPS is equal to vps_max_layers_minus1+1, the i-th OLS includes the layers with layer indices from 0 to i, inclusive, and for each OLS only the highest layer in the OLS is output. The ols_mode_idc is set equal to one to specify that the total number of OLSs specified by the VPS is equal to vps_max_layers_minus1+1, the i-th OLS includes the layers with layer indices from 0 to i, inclusive, and for each OLS all layers in the OLS are output. The ols_mode_idc is set equal to two to specify that the total number of OLSs specified by the VPS is explicitly signaled and for each OLS the highest layer and an explicitly signaled set of lower layers in the OLS are output. The value of ols_mode_idc shall be in the range of zero to two, inclusive. The value three of ols_mode_idc is reserved. When vps_all_independent_layers_flag is equal to one and each_layer_is_an_ols_flag is equal to zero, the value of ols_mode_idc is inferred to be equal to two. The num_output_layer_sets_minus1 plus 1 specifies the total number of OLSs specified by the VPS when ols_mode_idc is equal to two.

The variable TotalNumOlss, specifying the total number of OLSs specified by the VPS, is derived as follows.

```
if( vps_max_layers_minus1 = = 0)
    TotalNumOlss = 1
else if( each_layer_is_an_ols_flag || ols_mode_idc = = 0||
ols_mode_idc = = 1)
    TotalNumOlss = vps_max_layers_minus1 + 1
else if( ols_mode_idc = = 2)
    TotalNumOlss = num_output_layer_sets_minus1 + 1
```

The layer_included_flag[i][j] specifies whether the j-th layer (the layer with nuh_layer_id equal to vps_layer_id[j]) is included in the i-th OLS when ols_mode_idc is equal to two. The layer_included_flag[i][j] is set equal to one to specify that the j-th layer is included in the i-th OLS. The layer_included_flag[i][j] is set equal to zero to specify the j-th layer is not included in the i-th OLS.

The variable NumLayersInOls[i], specifying the number of layers in the i-th OLS, and the variable LayerIdInOls[i][j], specifying the nuh_layer_id value of the j-th layer in the i-th OLS, are derived as follows.

```
NumLayersInOls[ 0 ] = 1
LayerIdInOls[ 0 ][ 0 ] = vps_layer_id[ 0 ]
for( i = 1, i < TotalNumOlss; i++ ) {
    if( each_layer_is_an_ols_flag ) {
        NumLayersInOls[ i ] = 1
        LayerIdInOls[ i ][ 0 ] = vps_layer_id[ i ]
    } else if( ols_mode_idc = = 0 || ols_mode_idc = = 1 ) {
        NumLayersInOls[ i ] = i + 1
        for( j = 0; j < NumLayersInOls[ i ]; j++ )
            LayerIdInOls[ i ][ j ] = vps_layer_id[ j ]
    } else if( ols_mode_idc = = 2 ) {
        for( k = 0, j = 0; k <= vps_max_layers_minus1; k++ )
            if( layer_included_flag[ i ][ k ] )
                LayerIdInOls[ i ][ j++ ] = vps_layer_id[ k ]
        NumLayersInOls[ i ] = j
```

-continued

```
        }
    }
}
```

The variable OlsLayeIdx[i][j], specifying the OLS layer index of the layer with nuh_layer_id equal to LayerIdInOls [i][j], is derived as follows.

```
for( i = 0, i < TotalNumOlss; i++ )
    for j = 0; j < NumLayersInOls[ i ]; j++ )
        OlsLayeIdx[ i ][ LayerIdInOls[ i ][ j ] ] = j
```

The lowest layer in each OLS shall be an independent layer. In other words, for each i in the range of zero to TotalNumOlss-1, inclusive, the value of vps_independent_layer_flag[GeneralLayerIdx[LayerIdInOls[i] [0]]] shall be equal to one. Each layer shall be included in at least one OLS specified by the VPS. In other words, for each layer with a particular value of nuh_layer_id nuhLayerId, equal to one of vps_layer_id[k] for k in the range of zero to vps_max_layers_minus1, inclusive, there shall be at least one pair of values of i and j, where i is in the range of zero to TotalNumOlss-1, inclusive, and j is in the range of NumLayersInOls[i]−1, inclusive, such that the value of LayerIdInOls[i][j] is equal to nuhLayerId. Any layer in an OLS shall be an output layer of the OLS or a (direct or indirect) reference layer of an output layer of the OLS.

The vps_output_layer_flag[i][j] specifies whether the j-th layer in the i-th OLS is output when ols_mode_idc is equal to two. The vps_output_layer_flag[i] equal to one specifies that the j-th layer in the i-th OLS is output. The vps_output_layer_flag[i] is set equal to zero to specify that the j-th layer in the i-th OLS is not output. When vps_all_independent_layers_flag is equal to one and each_layer_is_an_ols_flag is equal to zero, the value of vps_output_layer_flag [i] is inferred to be equal to one. The variable OutputLayerFlag[i][j], for which the value one specifies that the j-th layer in the i-th OLS is output and the value zero specifies that the j-th layer in the i-th OLS is not output, is derived as follows.

```
for( i = 0, i < TotalNumOlss; i++ ) {
    OutputLayerFlag[ i ][ NumLayersInOls[ i ] − 1 ] = 1
    for( j = 0; j < NumLayersInOls[ i ] − 1; j++ )
        if( ols_mode_idc[ i ] = = 0 )
            OutputLayerFlag[ i ][ j ] = 0
        else if( ols_mode_idc[ i ] = = 1 )
            OutputLayerFlag[ i ][ j ] = 1
        else if( ols_mode_idc[ i ] = = 2 )
            OutputLayerFlag[ i ][ j ] = vps_output_layer_flag[ i ][ j ]
}
```

The 0-th OLS contains only the lowest layer (the layer with nuh_layer_id equal to vps_layer_id[0]) and for the 0-th OLS the only included layer is output.

The vps_extension_flag is set equal to zero to specify that no vps_extension_data_flag syntax elements are present in the VPS RBSP syntax structure. The vps_extension_flag is set equal to one to specify that there are vps_extension_data_flag syntax elements present in the VPS RBSP syntax structure. The vps_extension_data_flag may have any value. The presence and value of the vps_extension_data_flag do not affect decoder conformance to specified profiles. Decoders shall ignore all vps_extension_data_flag syntax elements.

An example DPB parameters semantics is as follows. The dpb_parameters( ) syntax structure provides DPB size information, and, optionally, maximum picture reorder number and maximum latency (MRML) information. Each SPS includes one or dpb_parameters( ) syntax structures. The first dpb_parameters( ) syntax structure in an SPS contains both DPB size information and MRML information. When present, the second dpb_parameters( ) syntax structure in an SPS contains DPB size information only. The MRML information in the first dpb_parameters( ) syntax structure in an SPS applies to a layer referring to the SPS regardless of whether the layer is an output layer in an OLS. The DPB size information in the first dpb_parameters( ) syntax structure in an SPS applies to a layer referring to the SPS when the layer is an output layer of an OLS. The DPB size information included in the second dpb_parameters( ) syntax structure, when present, in an SPS applies to a layer referring to the SPS when the layer is a non-output layer of an OLS. When an SPS includes only one dpb_parameters( ) syntax structure, the DPB size information for the layer as a non-output layer is inferred to be the same as that for the layer as an output layer.

An example general HRD parameters semantics is as follows. The general_hrd_parameters( ) syntax structure provides HRD parameters used in the HRD operations. The sub_layer_cpb_params_present_flag is set equal to one to specify that the i-th layer_level_hrd_parameters( ) syntax structure contains HRD parameters for the sub-layer representations with TemporalId in the range of zero to hrd_max_temporal_id[i], inclusive. The sub_layer_cpb_params_present_flag is set equal to zero to specify that the i-th layer_level_hrd_parameters( ) syntax structure contains HRD parameters for the sub-layer representation with TemporalId equal to hrd_max_temporal_id[i] only. When vps_max_sub_layers_minus1 is equal to zero, the value of sub_layer_cpb_params_present_flag is inferred to be equal to zero. When sub_layer_cpb_params_present_flag is equal to zero, the HRD parameters for the sub-layer representations with TemporalId in the range of zero to hrd_max_temporal_id[i]−1, inclusive, are inferred to be the same as that for the sub-layer representation with TemporalId equal to hrd_max_temporal_id[i]. These include the HRD parameters starting from the fixed_pic_rate_general_flag[i] syntax element till the sub_layer_hrd_parameters (i) syntax structure immediately under the condition if(general_vcl_hrd_params_present_flag) in the layer_level_hrd_parameters syntax structure. The num_layer_hrd_params_minus1 plus one specifies the number of layer_level_hrd_parameters( ) syntax structures present in the general_hrd_parameters( ) syntax structure. The value of num_layer_hrd_params_minus1 shall be in the range of zero to sixty three, inclusive. The hrd_cpb_cnt_minus1 plus one specifies the number of alternative CPB specifications in the bitstream of the CVS. The value of hrd_cpb_cnt_minus1 shall be in the range of zero to thirty one, inclusive. The hrd_max_temporal_id[i] specifies the TemporalId of the highest sub-layer representation for which the HRD parameters are contained in the i-th layer_level_hrd_parameters( ) syntax structure. The value of hrd_max_temporal_id[i] shall be in the range of zero to vps_max_sub_layers_minus1, inclusive. When vps_max_sub_layers_minus1 is equal to zero, the value of hrd_max_temporal_id[i] is inferred to be equal to zero. The layer_level_hrd_idx[i][j] specifies the index of the layer_level_hrd_parameters( ) syntax structure that applies to the j-th layer in the i-th OLS. The value of layer_level_hrd_idx[i][j] shall be in the range of zero to num_ layer_hrd_params_minus1, inclusive. When not present, the value of layer_level_hrd_idx[[0][0] is inferred to be equal to zero.

An example sub-bitstream extraction process is as follows. Inputs to this process are a bitstream inBitstream, a target OLS index targetOlsIdx, and a target highest TemporalId value tIdTarget. Output of this process is a sub-bitstream outBitstream. It is a requirement of bitstream conformance for the input bitstream that any output sub-bitstream that is the output of the process specified in this clause with the bitstream, targetOlsIdx equal to an index to the list of OLSs specified by the VPS, and tIdTarget equal to any value in the range of zero to six, inclusive, as inputs, and that satisfies the following conditions shall be a conforming bitstream. The output sub-bitstream should contain at least one VCL NAL unit with nuh_layer_id equal to each of the nuh_layer_id values in LayerIdInOls[targetOlsIdx]. The output sub-bitstream should contain at least one VCL NAL unit with TemporalId equal to tIdTarget. A conforming bitstream contains one or more coded slice NAL units with TemporalId equal to zero, but does not have to contain coded slice NAL units with nuh_layer_id equal to zero.

The output sub-bitstream OutBitstream is derived as follows. The bitstream outBitstream is set to be identical to the bitstream inBitstream. Remove from outBitstream all NAL units with TemporalId greater than tIdTarget. Remove from outBitstream all NAL units with nuh_layer_id not included in the list LayerIdInOls[targetOlsIdx]. Remove from outBitstream all SEI NAL units that contain a scalable nesting SEI message that has nesting_ols_flag equal to one and there is no value of i in the range of zero to nesting_num_olss_minus1, inclusive, such that NestingOlsIdx[i] is equal to targetOlsIdx. When targetOlsIdx is greater than zero, remove from outBitstream all SEI NAL units that contain a non-scalable-nested SEI message with payloadType equal to zero (buffering period), one (picture timing), or one hundred thirty (decoding unit information).

An example HRD general aspects is as follows. This section specifies the HRD and its use to check bitstream and decoder conformance. A set of bitstream conformance tests is employed for checking the conformance of a bitstream, which is referred to as the entire bitstream, denoted as entireBitstream. The set of bitstream conformance tests are for testing the conformance of each OLS specified by the VPS and the temporal subsets of each OLS. For each test, the following ordered steps apply in the order listed.

An operation point under test, denoted as targetOp, is selected by selecting a target OLS with OLS index opOlsIdx and a highest TemporalId value opTid. The value of opOlsIdx is in the range of zero to TotalNumOlss-one, inclusive. The value of opTid is in the range of zero to vps_max_sub_layers_minus1, inclusive. The values of opOlsIdx and opTid are such that the sub-bitstream BitstreamToDecode that is the output by invoking the sub-bitstream extraction process with entireBitstream, opOlsIdx, and opTid as inputs satisfy the following conditions. There is at least one VCL NAL unit with nuh_layer_id equal to each of the nuh_layer_id values in LayerIdInOls [opOlsIdx] in BitstreamToDecode. There is at least one VCL NAL unit with TemporalId equal to opTid in BitstreamToDecode.

The values of TargetOlsIdx and Htid are set equal to opOlsIdx and opTid, respectively, of targetOp. A value of ScIdx is selected. The selected ScIdx shall be in the range of zero to hrd_cpb_cnt_minus1, inclusive. An access unit in BitstreamToDecode associated with buffering period SEI messages (present in TargetLayerBitstream or available through an external mechanism not specified in this Specification) applicable to TargetOlsIdx is selected as the HRD initialization point and referred to as access unit zero for each layer in the target OLS.

The subsequent steps apply to each layer with OLS layer index TargetOlsLayerIdx in the target OLS. If there is only one layer in the target OLS, the layer bitstream under test TargetLayerBitstream is set identical to BitstreamToDecode. Otherwise, TargetLayerBitstream is derived by invoking the demultiplexing process for deriving a layer bitstream with BitstreamToDecode, TargetOlsIdx, and TargetOlsLayerIdx as inputs and the output is assigned to TargetLayerBitstream.

The layer_level_hrd_parameters( ) syntax structure and the sub_layer_hrd_parameters( ) syntax structure applicable to TargetLayerBitstream are selected as follows. The layer_level_hrd_idx[TargetOlsIdx][TargetOlsLayerIdx]-th layer_level_hrd_parameters( ) syntax structure in the VPS (or provided through an external mechanism such as user input) is selected. Within the selected layer_level_hrd_parameters( ) syntax structure, if BitstreamToDecode a is Type I bitstream, the sub_layer_hrd_parameters(Htid) syntax structure that immediately follows the condition if (general_vcl_hrd_params_present_flag) is selected and the variable NalHrdModeFlag is set equal to zero. Otherwise (BitstreamToDecode is a Type II bitstream), the sub_layer_hrd_parameters(Htid) syntax structure that immediately follows either the condition if (general_vcl_hrd_params_present_flag) (in this case the variable NalHrdModeFlag is set equal to zero) or the condition if (general_nal_hrd_params_present_flag) (in this case the variable NalHrdModeFlag is set equal to one) is selected. When BitstreamToDecode is a Type II bitstream and NalHrdModeFlag is equal to zero, all non-VCL NAL units except filler data NAL units, and all leading_zero_8 bits, zero_byte, start_code_prefix_one_3 bytes and trailing_zero_8 bits syntax elements that form a byte stream from the NAL unit stream, when present, are discarded from TargetLayerBitstream and the remaining bitstream is assigned to TargetLayerBitstream.

When decoding_unit_hrd_params_present_flag is equal to one, the CPB is scheduled to operate either at the access unit level (in which case the variable DecodingUnitHrdFlag is set equal to zero) or at the decoding unit level (in which case the variable DecodingUnitHrdFlag is set equal to one). Otherwise, DecodingUnitHrdFlag is set equal to zero and the CPB is scheduled to operate at the access unit level. For each access unit in TargetLayerBitstream starting from access unit zero, the buffering period SEI message (present in TargetLayerBitstream or available through an external mechanism) that is associated with the access unit and applies to TargetOlsIdx and TargetOlsLayerIdx is selected, the picture timing SEI message (present in TargetLayerBitstream or available through an external mechanism) that is associated with the access unit and applies to TargetOlsIdx and TargetOlsLayerIdx is selected, and when DecodingUnitHrdFlag is equal to one and decoding_unit_cpb_params_in_pic_timing_sei_flag is equal to zero, the decoding unit information SEI messages (present in TargetLayerBitstream or available through an external mechanism) that are associated with decoding units in the access unit and apply to TargetOlsIdx and TargetOlsLayerIdx are selected.

Each conformance test includes a combination of one option in each of the above steps. When there is more than one option for a step, for any particular conformance test only one option is chosen. All possible combinations of all the steps form the entire set of conformance tests. For each operation point under test, the number of bitstream conformance tests to be performed is equal to n0*n1*n2*n3, where the values of n0, n1, n2, and n3 are specified as follows. n1 is equal to hrd_cpb_cnt_minus1+1. n1 is the number of access units in BitstreamToDecode that are associated with buffering period SEI messages. n2 is derived as follows. If BitstreamToDecode is a Type I bitstream, no is equal to one. Otherwise (BitstreamToDecode is a Type II bitstream), no is equal to two. n3 is derived as follows. If decoding_unit_hrd_params_present_flag is equal to zero, n3 is equal to one. Otherwise, n3 is equal to two.

The HRD contains a bitstream demultiplexer (optionally present), a coded picture buffer (CPB) for each layer, an instantaneous decoding process for each layer, a decoded picture buffer (DPB) that contains a sub-DPB for each layer, and output cropping.

In an example, the HRD operates as follows. The HRD is initialized at decoding unit zero, with each CPB and each sub-DPB of the DPB set to be empty. The sub-DPB fullness for each sub-DPB is set equal to zero. After initialization, the HRD is not initialized again by subsequent buffering period SEI messages. Data associated with decoding units that flow into each CPB according to a specified arrival schedule are delivered by the HSS. The data associated with each decoding unit are removed and decoded instantaneously by the instantaneous decoding process at the CPB removal time of the decoding unit. Each decoded picture is placed in the DPB. A decoded picture is removed from the DPB when it becomes no longer needed for inter prediction reference and no longer needed for output.

In an example, the demultiplexing process for deriving a layer bitstream is as follows. Inputs to this process are a bitstream inBitstream, a target OLS index targetOlsIdx, and a target OLS layer index targetOlsLayerIdx. Output of this process is a layer bitstream outBitstream. The output layer bitstream outBitstream is derived as follows. The bitstream outBitstream is set to be identical to the bitstream inBitstream. Remove from outBitstream all NAL units with nuh_layer_id not equal to LayerIdInOls[targetOlsIdx][targetOlsLayerIdx]. Remove from outBitstream all SEI NAL units that contain a scalable nesting SEI message that has nesting_ols_flag equal to one and there are no values of i and j in the range of zero to nesting_num_olss_minus1, inclusive, and zero to nesting_num_ols_layers_minus1[i], inclusive, respectively, such that NestingOlsLayerIdx[i][j] is equal to targetOlsLayerIdx. Remove from outBitstream all SEI NAL units that contain a scalable nesting SEI message that has nesting_ols_flag equal to one and there are values of i and j in the range of zero to nesting_num_olss_minus1, inclusive, and zero to nesting_num_ols_layers_minus1[i], inclusive, respectively, such that NestingOlsLayerIdx[i][j] is less than targetOlsLayerIdx. Remove from outBitstream all SEI NAL units that contain a scalable nesting SEI message that has nesting_ols_flag equal to zero and there is no value of i in the range of zero to NestingNumLayers-1, inclusive, such that NestingLayerId[i] is equal to LayerIdInOls[targetOlsIdx][targetOlsLayerIdx]. Remove from outBitstream all SEI NAL units that contain a scalable nesting SEI message that has nesting_ols_flag equal to zero and there is at least one value of i in the range of zero to NestingNumLayers-1, inclusive, such that NestingLayerId[i] is less than LayerIdInOls[targetOlsIdx][targetOlsLayerIdx].

An example buffering period SEI message syntax is as follows.

| | Descriptor |
|---|---|
| buffering_period( payloadSize ) { | |
| ... | |
| bp_max_sub_layers_minus1 | u(3) |
| bp_cpb_cnt_minus1 | ue(v) |
| ... | |
| } | |

An example scalable nesting SEI message syntax is as follows.

| | Descriptor |
|---|---|
| scalable_nesting( payloadSize ) { | |
| nesting_ols_flag | u(1) |
| if( nesting_ols_flag ) { | |
| nesting_num_olss_minus1 | ue(v) |
| for( i = 0; i <= nesting_num_olss_minus1; i++ ) { | |
| nesting_ols_idx_delta_minus1[ i ] | ue(v) |
| if( NumLayersInOls[ NestingOlsIdx[ i ] ] > 1) { | |
| nesting_num_ols_layers_minus1[ i ] | ue(v) |
| for( j = 0; j <= nesting_num_ols_layers_minus1[ i ]; j++ ) | |
| nesting_ols_layer_idx_delta_minus1[ i ][ j ] | ue(v) |
| } | |
| } | |
| } else { | |
| nesting_all_layers_flag | u(1) |
| if( !nesting_all_layers_flag ) { | |
| nesting_num_layers_minus1 | ue(v) |
| for( i = 1; i <= nesting_num_layers_minus1; i++ ) | |
| nesting_layer_id[ i ] | u(6) |
| } | |
| } | |
| nesting_num_seis_minus1 | ue(v) |
| while( !byte_aligned( ) ) | |
| nesting_zero_bit /* equal to 0 */ | u(1) |
| for( i = 0; i <= nesting_num_seis_minus1; i++ ) | |
| sei_message( ) | |
| } | |

An example general SEI payload semantics is as follows. The following applies on the applicable layers (in the context of an OLS or generally) of non-scalable-nested SEI messages. For a non-scalable-nested SEI message, when payloadType is equal to zero (buffering period), one (picture timing), or one hundred thirty (decoding unit information), the non-scalable-nested SEI message applies only to the lowest layer in the context of the 0-th OLS. For a non-scalable-nested SEI message, when payloadType is equal to any value among VclAssociatedSeiList, the non-scalable-nested SEI message applies only to the layer for which the VCL NAL units have nuh_layer_id equal to the nuh_layer_id of the SEI NAL unit containing the SEI message.

An example buffering period SEI message semantics is as follows. A buffering period SEI message provides initial CPB removal delay and initial CPB removal delay offset information for initialization of the HRD at the position of the associated access unit in decoding order. When the buffering period SEI message is present, a picture is said to be a notDiscardablePic picture when the picture has TemporalId equal to zero and is not a RASL or random access decodable leading (RADL) picture. When the current picture is not the first picture in the bitstream in decoding order, let prevNonDiscardablePic be the preceding picture in decoding order with TemporalId equal to zero that is not a RASL or RADL picture.

The presence of buffering period SEI messages is specified as follows. If NalHrdBpPresentFlag is equal to one or VclHrdBpPresentFlag is equal to one, the following applies for each access unit in the CVS. If the access unit is an IRAP or Gradual Decoder Refresh (GDR) access unit, a buffering period SEI message applicable to the operation point shall be associated with the access unit. Otherwise, if the access unit contains a notDiscardablePic, a buffering period SEI message applicable to the operation point may or may not be associated with the access unit. Otherwise, the access unit shall not be associated with a buffering period SEI message applicable to the operation point. Otherwise (NalHrdBpPresentFlag and VclHrdBpPresentFlag are both equal to zero), no access unit in the CVS shall be associated with a buffering period SEI message. For some applications, frequent presence of buffering period SEI messages may be desirable (e.g., for random access at an IRAP picture or a non-IRAP picture or for bitstream splicing). When a picture in an access unit is associated with a buffering period SEI message, the access unit shall have a picture in each of the layers present in the CVS, and each picture in the access unit shall be with a buffering period SEI message.

The bp_max_sub_layers_minus1 plus 1 specifics the maximum number of temporal sub-layers for which CPB removal delay and CBP removal offset are indicated in the buffering period SEI message. The value of bp_max_sub_layers_minus1 shall be in the range of zero to vps_max_sub_layers_minus1, inclusive. The bp_cpb_cnt_minus1 plus 1 specifies the number of syntax element pairs nal_initial_cpb_removal_delay[i][j] and nal_initial_cpb_removal_offset[i][j] of the i-th temporal sub-layer when bp_nal_hrd_params_present_flag is equal to one, and the number of syntax element pairs vcl_initial_cpb_removal_delay[i][j] and vcl_initial_cpb_removal_offset [i][j] of the i-th temporal sub-layer when bp_vcl_hrd_params_present_flag is equal to one. The value of bp_cpb_cnt_minus1 shall be in the range of zero to thirty one, inclusive. The value of bp_cpb_cnt_minus1 shall be equal to the value of hrd_cpb_cnt_minus1.

An example picture timing SEI message semantics is as follows. The picture timing SEI message provides CPB removal delay and DPB output delay information for the access unit associated with the SEI message. If bp_nal_hrd_params_present_flag or bp_vcl_hrd_params_present_flag of the buffering period SEI mesage applicable for the current access unit is equal to one, the variable CpbDpbDelaysPresentFlag is set equal to one. Otherwise, CpbDpbDelaysPresentFlag is set equal to zero. The presence of picture timing SEI messages is specified as follows. If CpbDpbDelaysPresentFlag is equal to one, a picture timing SEI message shall be associated with the current access unit. Otherwise (CpbDpbDelaysPresentFlag is equal to zero), there shall not be a picture timing SEI message associated with the current access unit. The TemporalId in the picture timing SEI message syntax is the TemporalId of the SEI NAL unit containing the picture timing SEI message. The pt_max_sub_layers_minus1 plus 1 specifies the TemporalId of the highest sub-layer representation for which the CPB removal delay information is contained in the picture timing SEI message. The value of pt_max_sub_layers_minus1 shall be in the range of zero to vps_max_sub_layers_minus1, inclusive.

An example scalable nesting SEI message semantics is as follows. The scalable nesting SEI message provides a mechanism to associate SEI messages with specific layers in the context of specific OLSs or with specific layers not in the context of an OLS. A scalable nesting SEI message contains one or more SEI messages. The SEI messages contained in the scalable nesting SEI message are also referred to as the scalable-nested SEI messages. It is a requirement of bitstream conformance that the following restrictions apply on containing of SEI messages in a scalable nesting SEI message. An SEI message that has payloadType equal to one hundred thirty two (decoded picture hash) or one hundred thirty three (scalable nesting) shall not be contained in a scalable nesting SEI message. When a scalable nesting SEI message contains a buffering period, picture timing, or decoding unit information SEI message, the scalable nesting SEI message shall not contain any other SEI message with payloadType not equal to zero (buffering period), one (picture timing), or one hundred thirty (decoding unit information).

It is a requirement of bitstream conformance that the following restrictions apply on the value of the nal_unit_type of the SEI NAL unit containing a scalable nesting SEI message. When a scalable nesting SEI message contains an SEI message that has payloadType equal to zero (buffering period), once (picture timing), one hundred thirty (decoding unit information), one forty five (dependent RAP indication), or one hundred sixty eight (frame-field information), the SEI NAL unit containing the scalable nesting SEI message shall have nal_unit_type equal to PREFIX_SEI_NUT. When a scalable nesting SEI message contains an SEI message that has payloadType equal to one hundred thirty two (decoded picture hash), the SEI NAL unit containing the scalable nesting SEI message shall have nal_unit_type equal to SUFFIX_SEI_NUT.

The nesting_ols_flag is set to one to specify that the scalable-nested SEI messages apply to specific layers in the context of specific OLSs. The nesting_ols_flag is set to zero to specify that the scalable-nested SEI messages generally apply (not in the context of an OLS) to specific layers. It is a requirement of bitstream conformance that the following restrictions apply on the value of nesting_ols_flag. When the scalable nesting SEI message contains an SEI message that has payloadType equal to zero (buffering period), one (picture timing), or one hundred thirty (decoding unit information), the value of nesting_ols_flag shall be equal to one. When the scalable nesting SEI message contains an SEI message that has payloadType equal to a value in VclAssociatedSeiList, the value of nesting_ols_flag shall be equal to zero. The nesting_num_olss_minus1 plus 1 specifies the number of OLSs to which the scalable-nested SEI messages apply. The value of nesting_num_olss_minus1 shall be in the range of zero to TotalNumOlss−1, inclusive. The nesting_ols_idx_delta_minus1[i] is used to derive the variable NestingOlsIdx[i] that specifies the OLS index of the i-th OLS to which the scalable-nested SEI messages apply when nesting_ols_flag is equal to one. The value of nesting_ols_idx_delta_minus1[i] shall be in the range of zero to TotalNumOlss minus two, inclusive. The variable NestingOlsIdx[i] is derived as follows:

```
if(i == 0)
    NestingOlsIdx[ i ] = nesting_ols_idx_delta_minus1 [ i ]        (D-2)
else
    NestingOlsIdx[ i ] = NestingOlsIdx[ i - 1 ] + nesting_ols_idx_delta_
minus1[ i ] + 1
```

The nesting_num_ols_layers_minus1[i] plus 1 specifies the number of layers to which the scalable-nested SEI messages apply in the context of the NestingOlsIdx[i]-th OLS. The value of nesting_num_ols_layers_minus1[i] shall be in the range of zero to NumLayersInOls[NestingOlsIdx[i]]−1, inclusive. The nesting_ols_layer_idx_delta_minus1 [i][j] is used to derive the variable NestingOlsLayerIdx[i][j]

that specifies the OLS layer index of the j-th layer to which the scalable-nested SEI messages apply in the context of the NestingOlsIdx[i]-th OLS when nesting_ols_flag is equal to one. The value of nesting_ols_layer_idx_delta_minus1[i] shall be in the range of zero to NumLayersInOls[nestingOlsIdx[i]] minus two, inclusive. The variable NestingOlsLayerIdx[i][j] is derived as follows:

```
if(j == 0)
    NestingOlsLayerIdx[ i ][ j ] = nesting_ols_layer_idx_delta_          (D-2)
    minus1[ i ][ j ]
else
    NestingOlsLayerIdx[ i ][ j ] = NestingOlsLayerIdx[ i ][ j - 1 ] +
        nesting_ols_layer_idx_delta_minus1[ i ][ j ] + 1
```

The lowest value among all values of LayerIdInOls [NestingOlsIdx[i]] [NestingOlsLayerIdx[i][0]] for i in the range of zero to nesting_num_olss_minus1, inclusive, shall be equal to nuh_layer_id of the current SEI NAL unit (the SEI NAL unit containing the scalable nesting SEI message). The nesting_all_layers_flag is set to one to specify that the scalable-nested SEI messages generally apply to all layers that have nuh_layer_id greater than or equal to the nuh_layer_id of the current SEI NAL unit. The nesting_all_layers_flag is set to zero to specify that the scalable-nested SEI messages may or may not generally apply to all layers that have nuh_layer_id greater than or equal to the nuh_layer_id of the current SEI NAL unit. The nesting_num_layers_minus1 plus 1 specifies the number of layers to which the scalable-nested SEI messages generally apply. The value of nesting_num_layers_minus1 shall be in the range of zero to vps_max_layers_minus1−GeneralLayerIdx[nuh_layer_id], inclusive, where nuh_layer_id is the nuh_layer_id of the current SEI NAL unit. The nesting_layer_id[i] specifies the nuh_layer_id value of the i-th layer to which the scalable-nested SEI messages generally apply when nesting_all_layers_flag is equal to zero. The value of nesting_layer_id[i] shall be greater than nuh_layer_id, where nuh_layer_id is the nuh_layer_id of the current SEI NAL unit. When nesting_ols_flag is equal to zero, the variable NestingNumLayers, specifying the number of layer(s) to which the scalable-nested SEI messages generally apply, and the list NestingLayerId[i] for i in the range of zero to NestingNumLayers−1, inclusive, specifying the list of nuh_layer_id value of the layers to which the scalable-nested SEI messages generally apply, are derived as follows, where nuh_layer_id is the nuh_layer_id of the current SEI NAL unit.

```
if( nesting_all_layers_flag ) {
    NestingNumLayers =
    vps_max_layers_minus1 + 1 − GeneralLayerIdx[ nuh_layer_id ]
        for( i = 0; i < NestingNumLayers; i ++)
            NestingLayerId[ i ] = vps_layer_id[ GeneralLayerIdx[ nuh_layer_id ] + i ]
    } else {                                                                (D-2)
        NestingNumLayers = nesting_num_layers_minus1 + 1
        for( i = 0; i < NestingNumLayers; i ++)
            NestingLayerId[ i ] = ( i = = 0 ) ? nuh_layer_id : nesting_layer_id[ i ]
    }
```

The nesting_num_seis_minus1 plus one specifies the number of scalable-nested SEI messages. The value of nesting_num_seis_minus1 shall be in the range of zero to sixty three, inclusive. The nesting_zero_bit shall be equal to zero.

Figure 9:
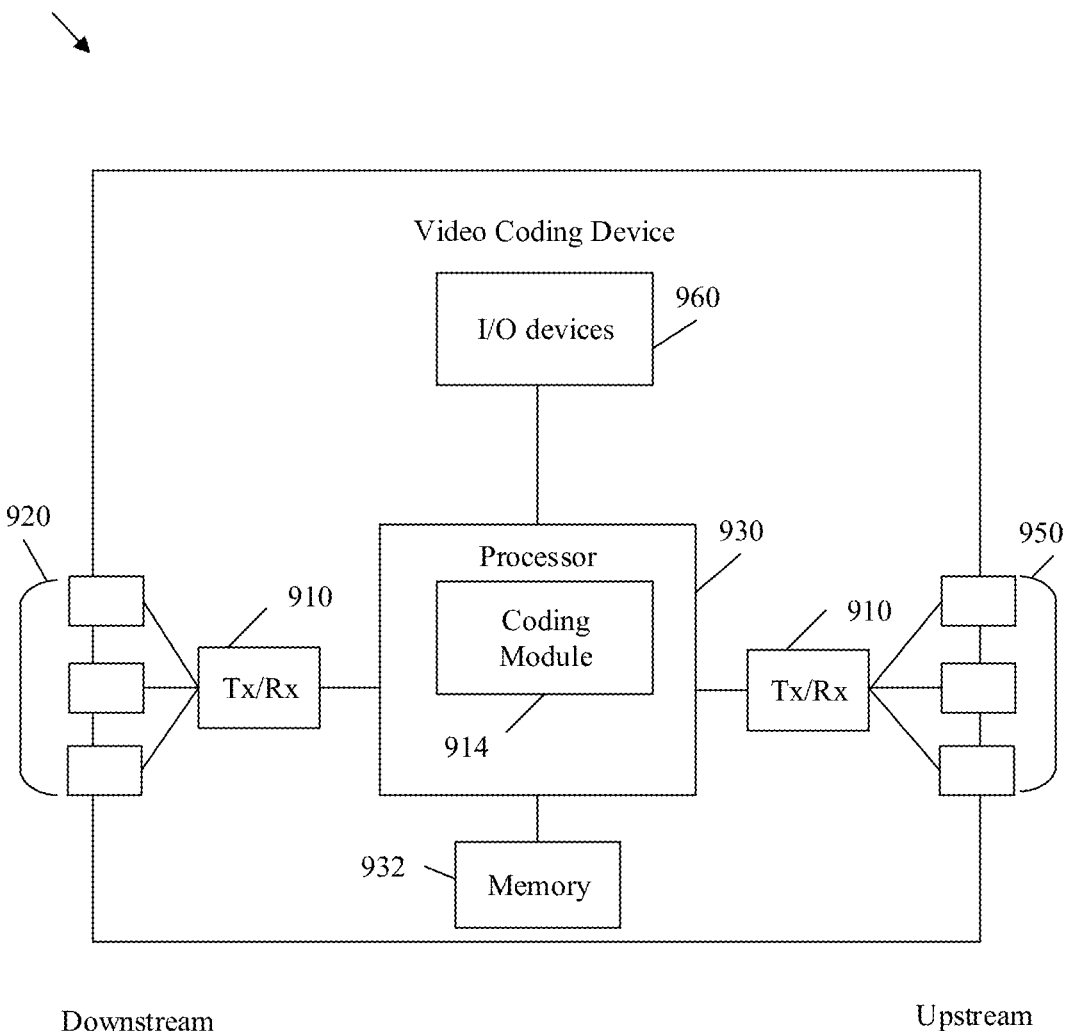
FIG. 9 is a schematic diagram of an example video coding device.

FIG. 9 is a schematic diagram of an example video coding device 900. The video coding device 900 is suitable for implementing the disclosed examples/embodiments as described herein. The video coding device 900 comprises downstream ports 920, upstream ports 950, and/or transceiver units (Tx/Rx) 910, including transmitters and/or receivers for communicating data upstream and/or downstream over a network. The video coding device 900 also includes a processor 930 including a logic unit and/or central processing unit (CPU) to process the data and a memory 932 for storing the data. The video coding device 900 may also comprise electrical, optical-to-electrical (OE) components, electrical-to-optical (EO) components, and/or wireless communication components coupled to the upstream ports 950 and/or downstream ports 920 for communication of data via electrical, optical, or wireless communication networks. The video coding device 900 may also include input and/or output (I/O) devices 960 for communicating data to and from a user. The I/O devices 960 may include output devices such as a display for displaying video data, speakers for outputting audio data, etc. The I/O devices 960 may also include input devices, such as a keyboard, mouse, trackball, etc., and/or corresponding interfaces for interacting with such output devices.

The processor 930 is implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the downstream ports 920, Tx/Rx 910, upstream ports 950, and memory 932. The processor 930 comprises a coding module 914. The coding module 914 implements the disclosed embodiments described herein, such as methods 100, 1000, and 1100, which may employ a multi-layer video sequence 600, a multi-layer video sequence 700, and/or a bitstream 800. The coding module 914 may also implement any other method/mechanism described herein. Further, the coding module 914 may implement a codec system 200, an encoder 300, a decoder 400, and/or a HRD 500. For example, the coding module 914 may be employed to implement a HRD. Further, the coding module 914 may be employed to encode parameters into a bitstream to support HRD conformance checking processes. Accordingly, the coding module 914 may be configured to perform mechanisms to address one or more of the problems discussed above. Hence, coding module 914 causes the video coding device 900 to provide additional functionality and/or coding efficiency when coding video data. As such, the coding module 914 improves the functionality of the video coding device 900 as well as addresses problems that are specific to the video coding arts. Further, the coding module 914 effects a transformation of the video coding device 900 to a different state. Alternatively, the coding module 914 can be implemented as instructions stored in the memory 932 and executed by the processor 930 (e.g., as a computer program product stored on a non-transitory medium).

The memory 932 comprises one or more memory types such as disks, tape drives, solid-state drives, read only memory (ROM), random access memory (RAM), flash memory, ternary content-addressable memory (TCAM), static random-access memory (SRAM), etc. The memory 932 may be used as an over-flow data storage device, to store programs when such programs are selected for execution, and to store instructions and data that are read during program execution.

FIG. 10 is a flowchart of an example method 1000 of encoding a video sequence into a bitstream by including a BP SEI message that directly references a maximum sublayer for a bitstream conformance test by a HRD. Method 1000 may be employed by an encoder, such as a codec system 200, an encoder 300, and/or a video coding device 900 when performing method 100. Further, the method 1000 may operate on a HRD 500 and hence may perform conformance tests on a multi-layer video sequence 600, a multi-layer video sequence 700, and/or a bitstream 800.

Method 1000 may begin when an encoder receives a video sequence and determines to encode that video sequence into a multi-layer bitstream, for example based on user input. At step 1001, the encoder can encode a bitstream. For example, the bitstream may include pictures organized into one or more sublayers, such as sublayers 710, 720, and/or 730. For example, the bitstream may be a temporal scalable bitstream encoded from a multi-layer video sequence, such as multi-layer video sequence 700. In such a case, the sublayers in the bitstream are referred to as temporal scalable layers/sublayers. Each sublayer is a set of data that includes VCL NAL units (e.g., picture slices) and associated non-VCL NAL units (e.g., parameters) with a same value of a TemporalId variable.

The encoder can also encode a VPS, such as VPS 811, into the bitstream. The VPS may contain data related to the entire bitstream. For example, the VPS may contain a vps_max_sublayers_minus1 syntax element. The vps_max_sublayers_minus1 syntax element may indicate a maximum number of sublayers specified by the VPS for a layer, OLS, and/or bitstream. The encoder may also encode a BP SEI message into the bitstream. The BP SEI message comprises a bp_max_sublayers_minus1 syntax element. The bp_max_sublayers_minus1 syntax element is a syntax element that specifies the maximum number of temporal sublayers for which an initial CPB removal delay and an initial CPB removal offset are indicated in the BP SEI message. The bp_max_sublayers_minus1 syntax element may be set to a value in a range of zero to a maximum number of sublayers indicated in the VPS, inclusive. For example, the value of bp_max_sublayers_minus1 syntax element may be set to any value from zero to vps_max_sublayers_minus1, inclusive. In this way, the BP SEI message may be associated with any number of sublayers in the bitstream as specified by the VPS.

The BP SEI message also includes one or more pairs of initial CPB removal delays and initial CPB removal offsets, which may be denoted as nal_initial_cpb_removal_delay and nal_initial_cpb_removal_offset, respectively. These values are parameters that are included in the BP SEI message and are associated with a maximum number of temporal sublayers specified by bp_max_sublayers_minus1.

At step 1003, the encoder can initialize a HRD based on the BP SEI message. For example, the HRD can be at a position of an associated AU or DU in decoding order for each layer/sublayer indicated by the value of bp_max_sublayers_minus1 in the BP SEI message. For example, the HRD can determine a CPB delivery schedule for each such layer/sublayer based on the values of the associated initial CPB removal delay and an initial CPB removal offset pair.

At step 1005, the HRD can perform a set of bitstream conformance tests on the sublayers based on the corresponding CPB delivery schedules. The bitstream can then be stored for communication toward a decoder at step 1007.

Figure 11:
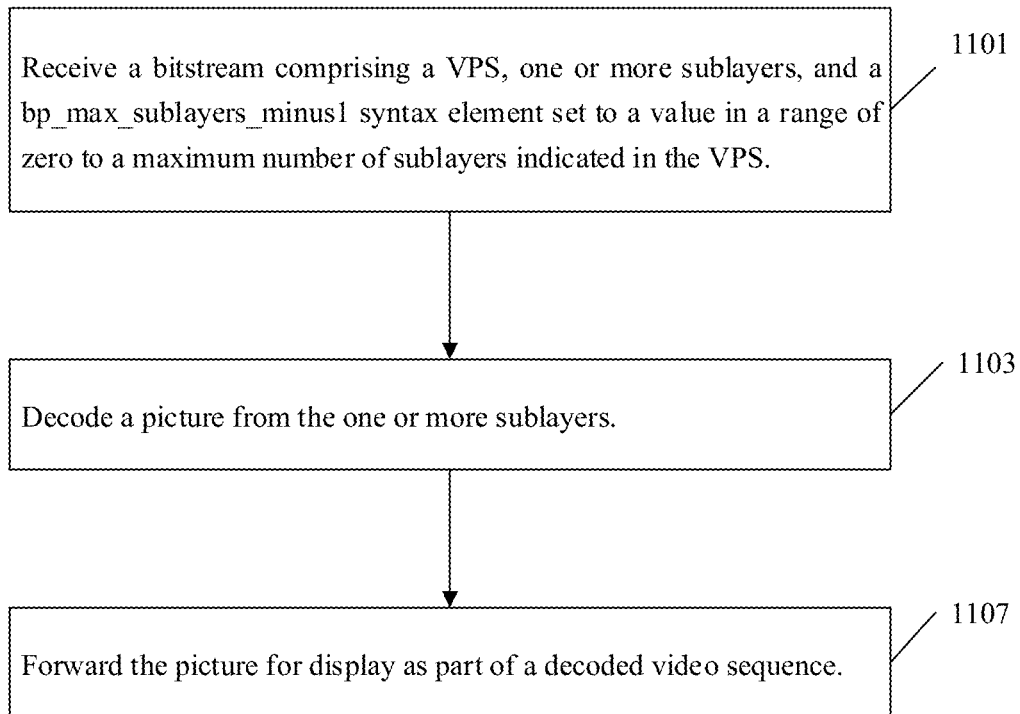
FIG. 11 is a flowchart of an example method of decoding a video sequence from a bitstream including a BP SEI message that directly references a maximum sublayer for a bitstream conformance test by a HRD.

FIG. 11 is a flowchart of an example method 1100 of decoding a video sequence from a bitstream including a BP SEI message that directly references a maximum sublayer for a bitstream conformance test by a HRD, such as HRD 500. Method 1100 may be employed by a decoder, such as a codec system 200, a decoder 400, and/or a video coding device 900 when performing method 100. Further, method 1100 may operate on a bitstream, such as bitstream 800, which includes a multi-layer video sequence 600 and/or a multi-layer video sequence 700.

Method 1100 may begin when a decoder begins receiving a bitstream of coded data representing a multi-layer video sequence, for example as a result of method 1000. At step 1101, the decoder receives a bitstream comprising one or more sublayers. For example, the bitstream may include pictures organized into one or more sublayers, such as sublayers 710, 720, and/or 730. For example, the bitstream may be a temporal scalable bitstream including a coded multi-layer video sequence, such as multi-layer video sequence 700. In such a case, the sublayers in the bitstream are referred to as temporal scalable layers/sublayers. Each sublayer is a set of data that includes VCL NAL units (e.g., picture slices) and associated non-VCL NAL units (e.g., parameters) with a same value of a TemporalId variable.

The bitstream also comprises a VPS, such as VPS 811. The VPS may contain data related to the entire bitstream. For example, the VPS may contain a vps_max_sublayers_minus1 syntax element. The vps_max_sublayers_minus1 syntax element may indicate a maximum number of sublayers specified by the VPS for a layer, OLS, and/or bitstream. The bitstream also comprise a BP SEI message. The BP SEI message comprises a bp_max_sublayers_minus1 syntax element. The bp_max_sublayers_minus1 syntax element is a syntax element that specifies the maximum number of temporal sublayers for which an initial CPB removal delay and an initial CPB removal offset are indicated in the BP SEI message. The bp_max_sublayers_minus1 syntax element may be set to a value in a range of zero to a maximum number of sublayers indicated in the VPS, inclusive. For example, the value of bp_max_sublayers_minus1 syntax element may be set to any value from zero to vps_max_sublayers_minus1, inclusive. In this way, the BP SEI message may be associated with any number of sublayers in the bitstream as specified by the VPS.

The BP SEI message also includes one or more pairs of initial CPB removal delays and initial CPB removal offsets, which may be denoted as nal_initial_cpb_removal_delay and nal_initial_cpb_removal_offset, respectively. These values are parameters that are included in the BP SEI message and are associated with a maximum number of temporal sublayers specified by bp_max_sublayers_minus1. The BP SEI message and associated data are employed for initialization of a HRD at a position of an associated AU or DU in decoding order during a bitstream standards conformance testing process at the HRD.

At step 1103, the decoder can decode a picture from the one or more sublayers. For example, the decoder can decode one or more of the sublayers and combine such sublayers into a sublayer representation, such as sublayer representation 740, for presentation to a user. At step 1107, the decoder can forward the decoded picture for display as part of a decoded video sequence.

Figure 12:
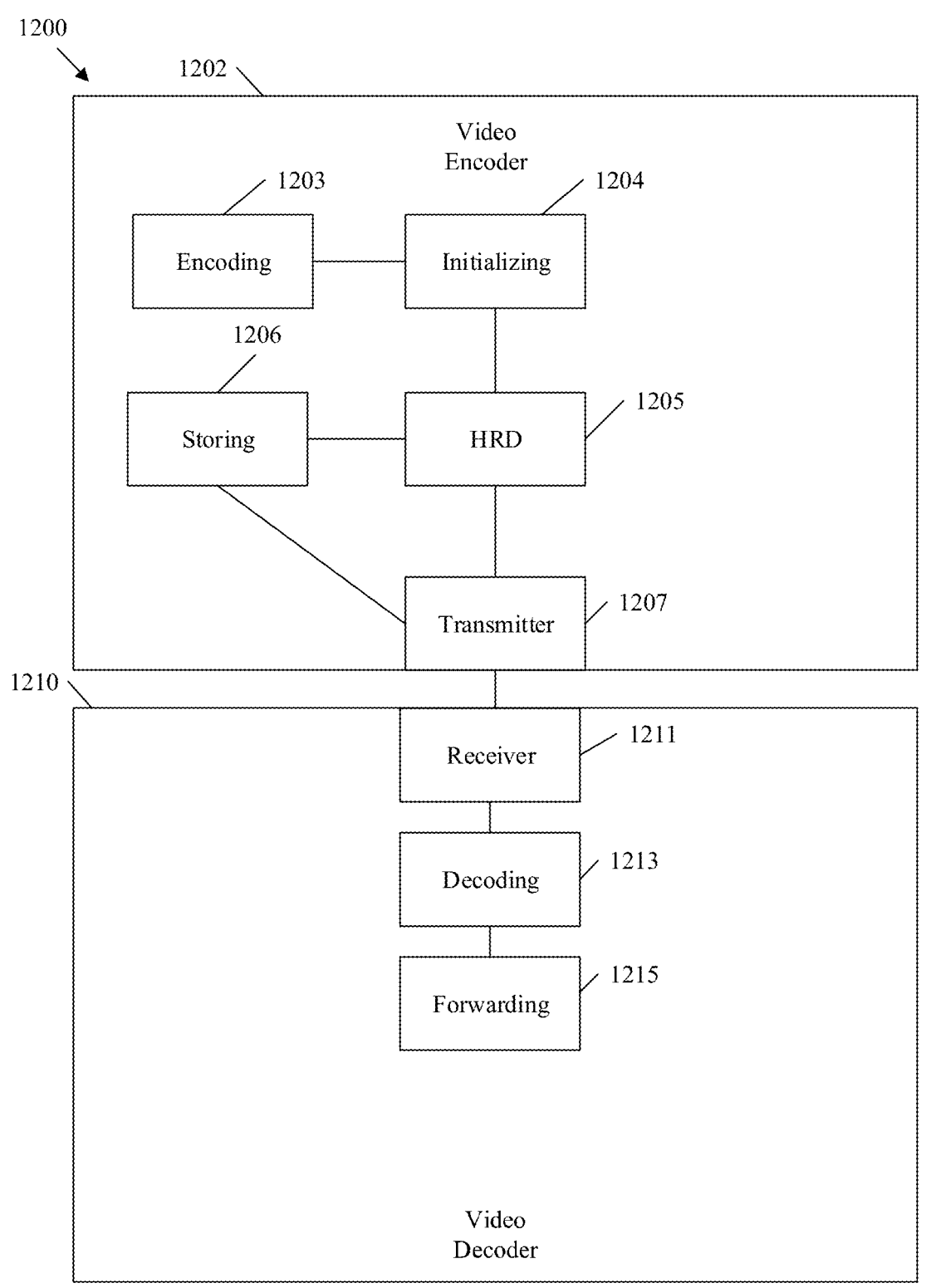
FIG. 12 is a schematic diagram of an example system for coding a video sequence in a bitstream including a BP SEI message that directly references a maximum sublayer for a bitstream conformance test by a HRD.

FIG. 12 is a schematic diagram of an example system 1200 for coding a video sequence in a bitstream including a BP SEI message that directly references a maximum sublayer for a bitstream conformance test by a HRD. System 1200 may be implemented by an encoder and a decoder such as a codec system 200, an encoder 300, a decoder 400, and/or a video coding device 900. Further, the system 1200 may employ a HRD 500 to perform conformance tests on a multi-layer video sequence 600, a multi-layer video sequence 700, and/or a bitstream 800. In addition, system 1200 may be employed when implementing method 100, 1000, and/or 1100.

The system 1200 includes a video encoder 1202. The video encoder 1202 comprises an encoding module 1203 for encoding a bitstream comprising a VPS and one or more sublayers. The encoding module 1203 is further for encoding into the bitstream a BP SEI message comprising a bp_max_sublayers_minus1 syntax element set to a value in a range of zero to a maximum number of sublayers indicated in the VPS. The video encoder 1202 further comprises an initializing module 1204 for initializing a HRD based on the BP SEI message. The video encoder 1202 further comprises a HRD module 1205 for performing a set of bitstream conformance tests on the sublayers. The video encoder 1202 further comprises a storing module 1206 for storing the bitstream for communication toward a decoder. The video encoder 1202 further comprises a transmitting module 1207 for transmitting the bitstream toward a video decoder 1210. The video encoder 1202 may be further configured to perform any of the steps of method 1000.

The system 1200 also includes a video decoder 1210. The video decoder 1210 comprises a receiving module 1211 for receiving a bitstream comprising a VPS, one or more sublayers, and a bp_max_sublayers_minus1) syntax element set to a value in a range of zero to a maximum number of sublayers indicated in the VPS. The video decoder 1210 further comprises a decoding module 1213 for decoding a picture from the one or more sublayers. The video decoder 1210 further comprises a forwarding module 1215 for forwarding the picture for display as part of a decoded video sequence. The video decoder 1210 may be further configured to perform any of the steps of method 1100.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A non-transitory computer-readable storage medium storing a bitstream that, when parsed by a coding device, is used by the coding device to generate a video, the bitstream comprising:

a video parameter set (VPS), one or more sublayers, a buffering period (BP) maximum sublayers minus one (bp_max_sublayers_minus1) set to a value in a range of zero to a maximum number of sublayers specified by the VPS, and a hypothetical reference decoder (HRD) coded picture buffer count minus one (hrd_cpb_cnt_minus1), wherein the hrd_cpb_cnt_minus1 plus one specifies a number of alternative coded picture buffer (CPB) delivery schedules, and wherein a value of hrd_cpb_cnt_minus1 is constrained to a range from zero to thirty one, inclusive.

2. The non-transitory computer-readable storage medium of claim 1, wherein the bp_max_sublayers_minus1 is included in a buffering period (BP) supplemental enhancement information (SEI) message, and wherein the BP SEI message includes parameters associated with a maximum number of temporal sublayers specified by bp_max_sublayers_minus1.

3. The non-transitory computer-readable storage medium of claim 2, wherein the parameters in the BP SEI message include an initial coded picture buffer (CPB) removal delay and an initial CPB removal offset.

4. The non-transitory computer-readable storage medium of claim 1, wherein the maximum number of sublayers specified by the VPS is included in a VPS maximum sublayers minus one (vps_max_sublayers_minus1) plus one.

5. The non-transitory computer-readable storage medium of claim 4, wherein the vps_max_sublayers_minus1 is contained in the VPS.

6. The non-transitory computer-readable storage medium of claim 2, wherein the bitstream is configured to initialize a HRD at a position of an associated access unit (AU) in decoding order based on the BP SEI message.

7. The non-transitory computer-readable storage medium of claim 1, wherein the bitstream is a temporal scalable bitstream, wherein the one or more sublayers are temporal scalable layers of the bitstream, and wherein each sublayer includes video coding layer (VCL) network abstraction layer (NAL) units and associated non-VCL NAL units with a same value of a temporal identifier (TemporalId) variable.

8. An encoder comprising:

a processor configured to:

encode a bitstream comprising a video parameter set (VPS) and one or more sublayers;

encode into the bitstream a buffering period (BP) supplemental enhancement information (SEI) message comprising a BP maximum sublayers minus one (bp_max_sublayers_minus1) set to a value in a range of zero to a maximum number of sublayers specified by the VPS, and a hypothetical reference decoder (HRD) coded picture buffer count minus one (hrd_cpb_cnt_minus1), wherein the hrd_cpb_cnt_minus1 plus one specifies a number of alternative coded picture buffer (CPB) delivery schedules, and wherein a value of hrd_cpb_cnt_minus1 is constrained to a range from zero to thirty one, inclusive;

initialize a HRD based on the BP SEI message; and perform with the HRD a set of bitstream conformance tests on the sublayers.

9. The encoder of claim 8, wherein the BP SEI message includes parameters associated with a maximum number of temporal sublayers specified by bp_max_sublayers_minus1.

10. The encoder of claim 9, wherein the parameters in the BP SEI message include an initial coded picture buffer (CPB) removal delay and an initial CPB removal offset.

11. The encoder of claim 8, wherein the maximum number of sublayers specified by the VPS is included in a VPS maximum sublayers minus one (vps_max_sublayers_minus1) plus one.

12. The encoder of claim 11, wherein the vps_max_sublayers_minus1 is contained in the VPS.

13. The encoder of claim 8, wherein the HRD is initialized at a position of an associated access unit (AU) in decoding order based on the BP SEI message.

14. The encoder of claim 8, wherein the bitstream is a temporal scalable bitstream, wherein the one or more sublayers are temporal scalable layers of the bitstream, and wherein each sublayer includes video coding layer (VCL) network abstraction layer (NAL) units and associated non-VCL NAL units with a same value of a temporal identifier (TemporalId) variable.

15. A non-transitory computer readable medium comprising a computer program product for use by a video coding device, the computer program product comprising computer executable instructions stored on the non-transitory computer readable medium such that when executed by a processor cause the video coding device to:

encode a bitstream comprising a video parameter set (VPS) and one or more sublayers;

encode into the bitstream a buffering period (BP) supplemental enhancement information (SEI) message comprising a BP maximum sublayers minus one (bp_max_sublayers_minus1) set to a value in a range of zero to a maximum number of sublayers specified by the VPS, and a hypothetical reference decoder (HRD) coded picture buffer count minus one (hrd_cpb_cnt_minus1), wherein the hrd_cpb_cnt_minus1 plus one specifies a number of alternative coded picture buffer (CPB) delivery schedules, and wherein a value of hrd_cpb_cnt_minus1 is constrained to a range from zero to thirty one, inclusive;

initialize a HRD based on the BP SEI message; and perform with the HRD a set of bitstream conformance tests on the sublayers.

16. The non-transitory computer readable medium of claim 15, wherein the bp_max_sublayers_minus1 is included in a buffering period supplemental enhancement information (SEI) message, and wherein the BP SEI message includes parameters associated with a maximum number of temporal sublayers specified by bp_max_sublayers_minus1.

17. The non-transitory computer readable medium of claim 16, wherein the parameters in the BP SEI message include an initial coded picture buffer (CPB) removal delay and an initial CPB removal offset.

18. The non-transitory computer readable medium of claim 15, wherein the maximum number of sublayers specified by the VPS is included in a VPS maximum sublayers minus one (vps_max_sublayers_minus1) plus one.

19. The non-transitory computer readable medium of claim 18, wherein the vps_max_sublayers_minus1 is contained in the VPS.

20. The non-transitory computer readable medium of claim 16, wherein the HRD is initialized at a position of an associated access unit (AU) in decoding order based on the BP SEI message.

* * * * *